United States Patent
Fellner

(10) Patent No.: US 12,496,267 B2
(45) Date of Patent: Dec. 16, 2025

(54) EXTRACT OF ORGANIC HUMIFIED MATERIALS

(71) Applicant: Stefan Johannes Fellner, Vienna (AT)

(72) Inventor: Stefan Johannes Fellner, Vienna (AT)

( * ) Notice: Subject to any disclaimer, the term of this patent is extended or adjusted under 35 U.S.C. 154(b) by 676 days.

(21) Appl. No.: 17/765,405

(22) PCT Filed: Oct. 1, 2020

(86) PCT No.: PCT/EP2020/077526
§ 371 (c)(1),
(2) Date: Mar. 30, 2022

(87) PCT Pub. No.: WO2021/064105
PCT Pub. Date: Apr. 8, 2021

(65) Prior Publication Data
US 2022/0387294 A1 Dec. 8, 2022

(30) Foreign Application Priority Data
Oct. 1, 2019 (EP) .................................... 19200849

(51) Int. Cl.
*A61K 8/96* (2006.01)
*A23L 33/10* (2016.01)
*A61K 8/02* (2006.01)
*A61Q 5/00* (2006.01)
*A61Q 19/00* (2006.01)

(52) U.S. Cl.
CPC ............. *A61K 8/965* (2013.01); *A23L 33/10* (2016.08); *A61K 8/0241* (2013.01); *A61Q 5/00* (2013.01); *A61Q 19/00* (2013.01); *A61K 2800/412* (2013.01); *A61K 2800/92* (2013.01)

(58) Field of Classification Search
CPC .. A61K 8/965; A61K 35/10; A61K 2800/412; A61Q 5/00; A61Q 19/00
See application file for complete search history.

(56) References Cited

U.S. PATENT DOCUMENTS

| | | | |
|---|---|---|---|
| 5,747,050 A | 5/1998 | Tolpa et al. | |
| 6,869,612 B2 | 3/2005 | Ghosal | |
| 8,114,910 B2 | 2/2012 | Loxton et al. | |
| 2012/0034281 A1* | 2/2012 | Kaneko | A61Q 1/12 424/401 |
| 2014/0079729 A1 | 3/2014 | Kalidindi | |
| 2015/0216839 A1* | 8/2015 | Black, Sr. | A61K 31/4412 424/401 |
| 2016/0095881 A1 | 4/2016 | Sen | |

FOREIGN PATENT DOCUMENTS

| | | |
|---|---|---|
| DE | 2850685 | 6/1980 |
| EP | 1126837 B1 | 8/2006 |
| EP | 1698333 B1 | 10/2008 |
| EP | 1700599 B1 | 10/2008 |
| EP | 1700600 B1 | 10/2008 |
| EP | 2878342 A1 | 6/2015 |
| JP | 2004269484 A | 9/2004 |
| JP | 6120342 | 4/2017 |
| JP | 6581426 | 9/2019 |
| JP | 6581462 B2 | 9/2019 |
| WO | 2013022752 A1 | 2/2013 |

OTHER PUBLICATIONS

Mishra et al., "Shilajit (Mumie): Current Status of Biochemical, Therapeutic and Clinical Advances", Apr. 1, 2019, Current Nutrition & Food Science, vol. 15, No. 2, pp. 104-120. (Year: 2019).*
International Search Report for corresponding International Patent Application No. PCT/EP2020/077526 dated Jan. 13, 2021.
International Written Opinion for corresponding International Patent Application No. PCT/EP2020/077526 dated Jan. 13, 2021.
Buffle, J. et al. "Measurement of Complexation Properties of Humic and Fulvic Acids in Natural Waters with Lead and Copper Ion-Selective Electrodes", Anal. Chem., 1977, vol. 49, No. 2, pp. 216-222.
Frosch, P. J. et al. "A method for appraising the stinging capacity of topically applied substances", A M, J Soc Cosmet Chem., 1977, vol. 28, pp. 197-209.
Extended European Search Report, 19200849.8, dated Mar. 4, 2020, 10 pgs.

* cited by examiner

*Primary Examiner* — Michael B. Pallay
(74) *Attorney, Agent, or Firm* — LOZA & LOZA, LLP; Michael Fedrick

(57) ABSTRACT

A dry extract of organic humified material for cosmetic, medical or dietary use, wherein the dry extract comprises fulvic acid and humic acid, and is characterized by a maximum average particle size of 20 micrometer.

11 Claims, 21 Drawing Sheets

Fig. 4 A

Figure 1A:
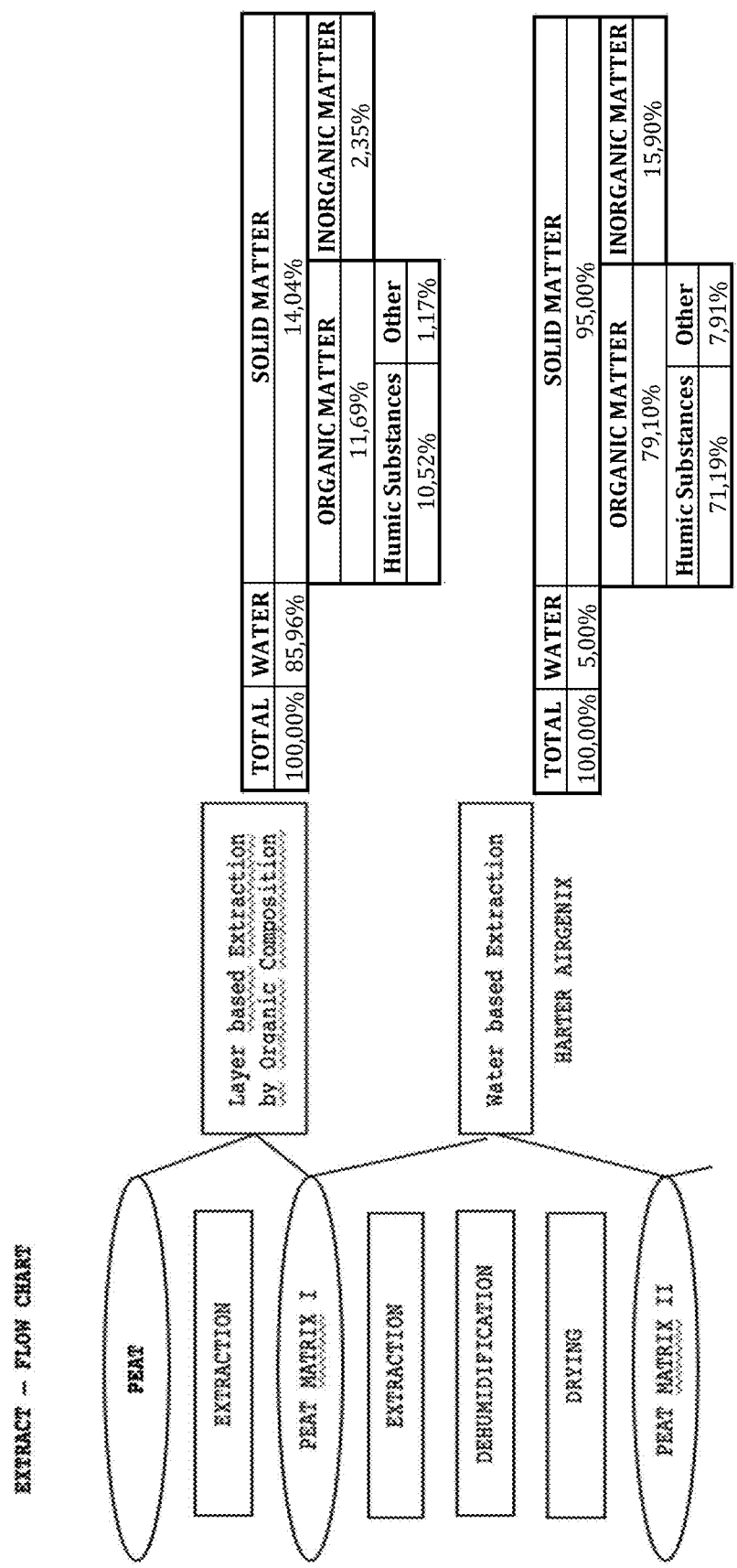

Variation of the Intensity of stinging
in comparison with the basal value and the non-treated area

| | Kinetic | Δ (mean ± SEM) | Δ%on the mean | Type of statistical test | p-value | Significance | % of the subjets presenting |
|---|---|---|---|---|---|---|---|
| Area with the studied product | Δ D0t30 | -1 ± 0 | -48% | Wilcoxon | <0.001 | Yes | 86% |
| Area without the studied product | | 0 ± 0 | 4% | Wilcoxon | 0.0625 | No | 5% |
| Area with the studied product | Δ D0t5 | -2 ± 0 | -89% | Wilcoxon | <0.001 | Yes | 100% |
| Area without the studied product | | 0 ± 0 | -17% | T-test | 0.0073 | No | 45% |
| Area with the studied product | Δ D0t15 | -2 ± 0 | -100% | Wilcoxon | <0.001 | Yes | 100% |
| Area without the studied product | | -2 ± 0 | -79% | Wilcoxon | <0.001 | Yes | 86% |

Fig. 4 B

Variation of the duration of stinging
in comparison with the basal value and the non-treated area

| | Δ (mean ± SEM) | Δ%on the mean | Type of statistical test | p-value | Significance | % of the subjects presenting an improvement |
|---|---|---|---|---|---|---|
| Treated/Non-treated comparison of a stinging duration | -568 ± 44 | -80% | T-Test | <0.001 | Yes | 100% |

| | | | | A significant decrease in the stinging intensity on the nasolabial fold induces a preventive soothing affect in the product | | | |
|---|---|---|---|---|---|---|---|
| Kinetic | Cuteneous reactivity score on D-X (mean ± SEM) | Cuteneous reactivity score on D-28 (mean ± SEM) | Variations of cuteneous reactivity score after 28 days of use (mean ± SEM) | Δ% on the mean | Type of statistical test | p-value | Significance | % of the subjets presenting an improvement |
| Δ D28 | 4.5 ± 0.3 | 1.5 ± 0.4 | -3.0 ± 0.4 | -67% | Wilcoxon | <0.001 | Yes | 95% |
| SOOTHING EFFECT | | | | | | | | |

Fig. 5

Fig. 6 A

Variation of the clinical scoring in comparison with the initial state

| | Kinetics | Δ (mean ± SEM) | Δ%on the mean | Statistical analysis | | | % of the subjects with the expected effect |
| --- | --- | --- | --- | --- | --- | --- | --- |
| | | | | p-value | Significance | Test | |
| RADIANCE UNDER EYE | Δ D0T5MIN | +0.0 ± 0.1 | 0% | NA | | | 5% |
| | Δ D28 | +0.8 ± 0.2 | 17% | 0.0012 | Yes | Student | 67% |

Fig. 6 B

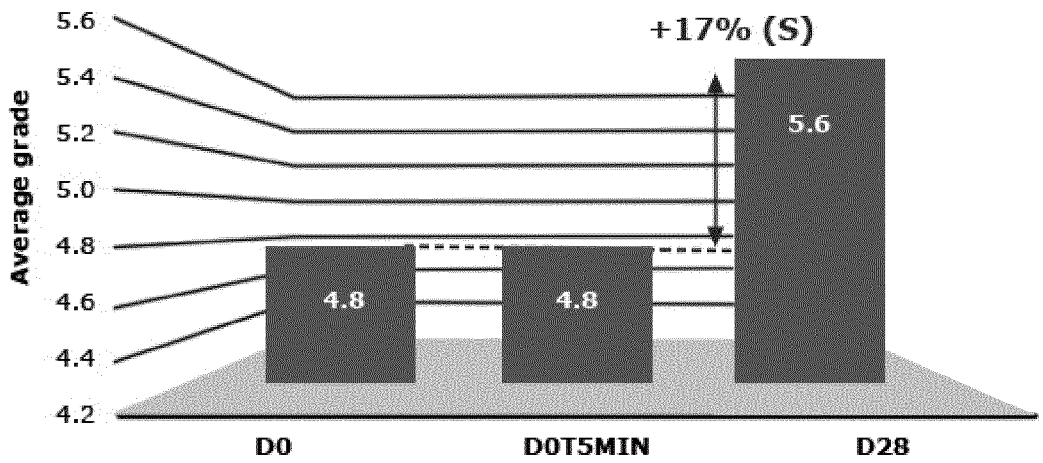

Brighter / more radiant eye contour area: *increase in the average grade of +17% on the average; an effect is measured in 67% of the subjects*

Fig. 7

| | Kinetics | Δ (mean ± SEM) | Δ % on the mean | Statistical analysis ||| % of the subjets with the expected effect |
| --- | --- | --- | --- | --- | --- | --- | --- |
| | | | | p-value | Statistacal test | Significativity | |
| Firmness (R0 - Uf) | Δ D0T5MIN | -0.0004 ± 0.005 | -1% | 0.8144 | Wilcoxon | No | 19% |
| | Δ D28 | -0.015 ± 0.006 | -4% | 0.0204 | Student | Yes | 43% |
| Viscoelasticity R6 | Δ D0T5MIN | 0.000 ± 0.0014 | 0% | 0.9950 | Student | No | 48% |
| | Δ D28 | -0.049 ± 0.0018 | -11% | 0.0127 | Student | Yes | 57% |
| Plasticity Uv | Δ D0T5MIN | -0.001 ± 0.002 | -1% | 0.7874 | Student | No | 19% |
| | Δ D28 | -0.012 ± 0.004 | -12% | 0.0084 | Student | Yes | 48% |

Firmer skin: *significant decrease in the R0 parameter after 28 days of use: -4% on average; an effect is measured in 43% of the subjects*

Less aged skin: *significant decrease in the R6 parameter after 28 days of use: -11% on average; an effect is measured in 48% of the subjects*

Less aged skin: *significant decrease in the Uv parameter after 28 days of use: -12% on average; an effect is measured in 48% of the subjects*

Fig. 9 A

Variation of the cutaneous hydration rate
in comparison with the initial state

| | Kinetics | Δ (mean ± SEM) | Δ % on the mean | Statistical analysis | | | % of the subjets with the expected effect |
|---|---|---|---|---|---|---|---|
| | | | | p-value | Significance | Test | |
| CORNEOMETER MEASUREMENTS | Δ D0T5min | 5.9 ± 1.5 | 11% | 0.0007 | YES | Student | 81% |
| | Δ D28 | 2.9 ± 1.2 | 6% | 0.0278 | YES | Student | 53% |

Fig. 9 B

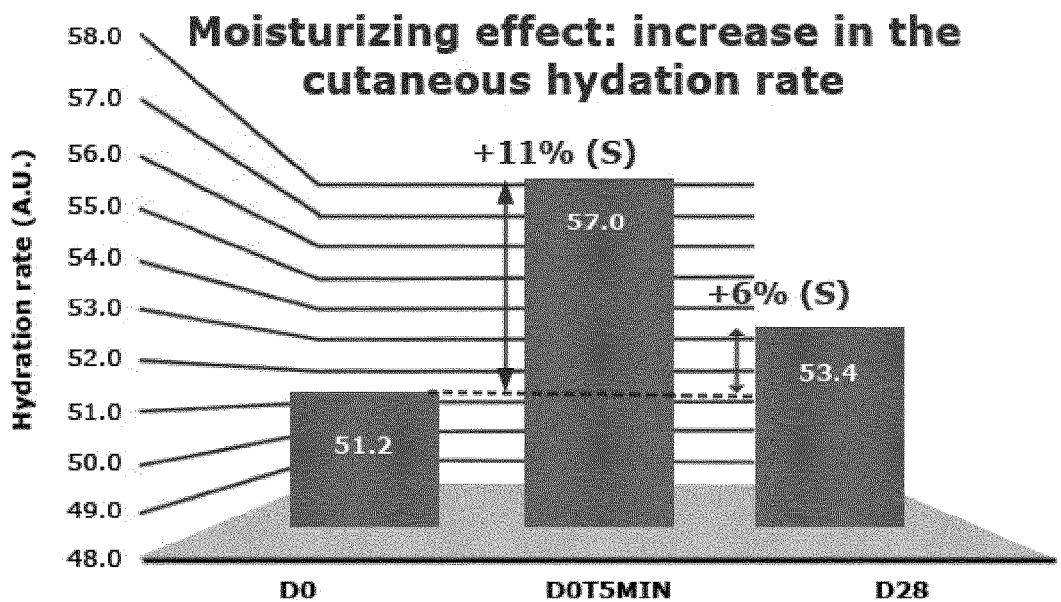

More moisturized skin: *increase in the cutaneeous hydration rate*
-5 minutes after a single application at the laboratory: +11%; an effect is
measured in 81% of the subjects
- after 28 days of use: +6%; an effect is measured in 53% of the subjects

Fig. 12A

| Medium before treatment | Medium after treatment | Evaluation |
|---|---|---|
| | | 72 hours after mechanical scratching the monolayer regenerated well. Cells reached the borders of the cross. |
| AHE1% before treatment | AHE1% after treatment | |
| | | 72 hours after mechanical scratching the monolayer regenerated well. Cells reached the borders of the cross. Somewhat inhomogeneous growth in the various areas might be dependent on the preculture |
| AHE 5% before treatment | AHE 5% after treatment | |
| | | 72 hours after mechanical scratching the monolayer regenerated well. Cells reached the borders of the cross. Somewhat inhomogeneous growth in the various areas might be dependent on the preculture |
| FA before treatment | FA after treatment | |
| | | 72 hours after mechanical scratching the monolayer regenerated well. Cells reached the borders of the cross. Monolyaer not as dense as in the case of AHE |
| Charcoal before treatment | Charcoal after treatment | |
| | | 72 hours after mechanical scratching no living cells colud be observed |

| Medium before treatment | Medium after treatment | Evaluation |
|---|---|---|
| EGF before treatment | EGF after treatment | |
| | | 72 hours after mechanical scratching the monolayer regenerated well even across the borders of the cross formed scratch. Extremely high density of the monolayer |

EXTRACT OF ORGANIC HUMIFIED MATERIALS

CROSS-REFERENCE TO RELATED APPLICATIONS

This application is the U.S. national stage of International Patent Application No. PCT/EP2020/077526, filed on Oct. 1, 2020 and entitled EXTRACT OF ORGANIC HUMIFIED MATERIALS, which claims the benefit of priority under 35 U.S.C. § 119 from European Patent Application No. 19200849.8, filed Oct. 1, 2019. The disclosures of the foregoing applications are incorporated herein by reference in their entirety.

FIELD OF THE INVENTION

The invention relates to extracts of organic humified source material, methods of their production and uses thereof. The invention specifically relates to formulations comprising humic substances and their use in cosmetic, pharmaceutical and dietary preparations.

BACKGROUND OF THE INVENTION

Peat, also known as turf, is an accumulation of partially decayed vegetation or organic matter. It is unique to natural areas called peatlands, bogs, mires, moors, or muskegs. Peat is a heterogeneous organic soil type resulting from the incomplete decay and humification of plant (humus) material that has accumulated in a water-saturated environment and in the absence of oxygen. Its structure ranges from more or less decomposed plant remains to a fine amorphic, colloidal mass.

Typically, the organic matter comprised in peat comprises humic substances, cellulose, hemicellulose, pectines, proteins and bitumen.

Peat and its preparations have a long history of use in cosmetic products and as preparations for ailments. Different extracts of peat or other organic materials have been used in these products and various methods of producing the extracts have been established in the past.

U.S. Pat. No. 5,747,050B1, for example, describes a process of producing a peat extract from a highly concentrated aqueous inorganic salt solution containing peat-derived bioactive ingredients, by diluting said solution with demineralized water, followed by reverse osmosis, concentration and clarification. However, this extract has a high concentration of inorganic matter.

US2014/0079729A1 describes a medicament comprising Shilajit for the treatment of endothelial dysfunction. The preferred active ingredient is PrimaVie™, a dietary supplement which is extracted and processed from Shilajit bearing rocks and contains fulvic acid.

DE2850685A1 describes production of a colloidal aqueous slurry from sewage sludge and sawdust, for use in medical treatments. The aqueous slurry comprises fulvic acid, humic acid and about 20% water.

JP6120342B1 describes a humus extract which is obtained for example from humic shale which is an ancient plant sedimentary layer in Emery County, Utah, USA.

JP6120342B1 further discloses that humic extracts containing fulvic acid and having a specific wavelength, such as e.g. Humikuru™, have a suppressive effect on the production of MMP-1.

JP6581462B2 describes a cosmetic preparation containing a humus soil extract and a polysaccharide containing glucuronic acid for use on skin and hair.

EP2878342A1 discloses a peat extract obtained by adding 80% ethanol to dry peat, shaking the suspension at speed and filtering the extract through 0.45 µm syringe filters.

WO2013022752A1 describes extraction of humic substances from organic materials using electromagnetic fields, specifically a pulsed electromagnetic signal.

Humic substances may also be obtained from sources other than peat.

JP2004269484A, for example, describes the extraction of fulvic acid from low-grade coal using high-temperature water under pressure. U.S. Pat. No. 8,114,910B2 describes the production of a composition comprising fulvic acid from a carbohydrate.

EP1700600B1 discloses use of fulvic acid in the treatment of inflammation, such as for example acne or eczema. Fulvic acid has also been used in the treatment of *candida* infections (EP1700599B1), viral infections (EP1698333B1) and bacterial infections (EP1126837B1).

A common drawback of present extracts of organic material is their limited effect in formulations for cosmetic or pharmaceutical use.

SUMMARY OF THE INVENTION

It is the objective of the present invention to provide improved extracts of organic material and formulations for cosmetic, pharmaceutical or dietary use. It is a further objective to provide dermatologic treatment methods.

The objective is solved by the subject of the claims and as further described herein.

According to the invention, there is provided the use of a cosmetic composition or product comprising a dry extract of organic humified material comprising humic substances which comprise at least fulvic acid and humic acid, which extract is characterized by a maximum average particle size of 20 micrometer (µm), for dermatologic treatment, in particular for cosmetic dermatologic treatment.

Specifically, the dry extract is a micronized dry extract.

Specifically provided herein is use of a cosmetic composition comprising a micronized dry extract of organic humified material comprising fulvic acid and humic acid, which extract is characterized by a maximum average particle size of 20 micrometer (µm), for cosmetic dermatologic treatment.

Specifically, the extract described herein comprises at least fulvic acid and humic acid, and optionally ulmic acid. Specifically, the extract described herein comprises fulvic acid and humic acid, wherein a fraction of humic acid is comprised of ulmic acid. Specifically, the extract described herein comprises at least fulvic acid, humic acid, and ulmic acid. According to a preferred embodiment, the extract comprises at least two or three different humic substance components, namely at least fulvic acid and humic acid; or at least fulvic acid, humic acid, and ulmic acid. It is specifically understood that such humic substance components are each comprised in an effective amount.

Specifically, the humic acid component is provided as complex mixture of many different acids containing carboxyl and phenolate groups so that the mixture behaves functionally as a dibasic acid or, occasionally, as a tribasic acid; or else provided as humic colloids, such as created upon complexing with cations, such as metal ions or ammonium ions.

Specifically, the fulvic acid component is provided as fulvic colloids.

Specifically, the ulmic acid component is a subfraction of the humic acid component.

Specifically, the humic substances contain aromatic and polyaromatic groups (including heteroatoms) and C=C conjugated double bonds in aliphatic residues, acid groups, mainly phenol and carboxyl groups, carbonyls and sugars. They may also contain stable free radicals. The molecular weight of the humic substances is typically between 2000 and 300 000 dalton.

Specifically, dermatologic treatment comprises or consists of skin treatment, in particular to reduce inflammatory effects, reduce acne lesions, moisturize skin, improve wound healing, improve the skin barrier, purify skin, reduce skin damage caused by air-pollution, improve sebum-regulation, or to achieve anti-stinging, soothing, improve wound healing, improve skin barrier function, improve cellular regeneration, and/or anti-aging of skin, such as reducing crow's feet, or reducing or preventing fine lines.

Specifically, dermatologic treatment comprises or consists of hair treatment, in particular to improve flexibility of hair fibers, elasticity of hair fibers, hair volume, reduce flakiness on top of the hair, improve shine of hair fibers, repair hair fibers, improve scalp conditions and/or reduce dandruff.

Specifically, dermatologic treatment comprises or consists of oral mucosal treatment to improve gum condition, reduce periimplantitis and periodontitis or periimplantitis and periodontitis—causing bacteria, reduce odor or odor-causing bacteria, reduce caries or caries causing pathogens, reduce plaque, improve wound healing and/or improve teeth whitening.

Specifically, the cosmetic composition or product is in the form of a cream, emulsion, gel, ointment, lotion, spray, foam, solution, dry powder, tablet, shampoo, hair conditioner, bath salt, bath ball, tooth paste, deodorant, soap, skin gel, lip balm, facial mask, or makeup.

Specifically, the dry extract is formulated in the form of a cream, emulsion, gel, ointment, lotion, spray, foam, solution, dry powder, tablet, shampoo, hair conditioner, bath salt, bath ball, tooth paste, deodorant, soap, skin gel, lip balm, facial mask, or makeup. Preferably, it is formulated in the form of a cream, emulsion, gel, ointment, lotion, spray, dry powder or a tablet.

Further provided herein is a dry extract of organic humified material comprising at least the two of fulvic acid and humic acid, and optionally ulmic acid, which extract is characterized by a maximum average particle size of 20 micrometer (µm), for use as a medicament.

Specifically, the dry extract for use as a medicament is a micronized dry extract. Specifically, the dry extract described herein is provided for use in the treatment of a subject suffering from a dermatologic disease or disorder. Specifically, the disease or disorder is selected from acne, psoriasis, atopic dermatitis, skin inflammation and skin redness.

Specifically, the extract or medicament described herein is provided for the treatment of atopic dermatitis, in particular to reduce at least one, preferably at least two, of the atopic dermatitis-related symptoms selected from the group consisting of development of erythema, development of oedema, development of papule, exuding, incrusting, excoriation, lichenification, poor wound healing and dry skin.

Specifically, the extract or medicament described herein is provided for the treatment of psoriasis, in particular to reduce at least one, preferably at least two, of the psoriasis-related symptoms selected from the group consisting of skin redness, raised skin, and skin shedding, also referred to as flaking.

Specifically, the medicament is in the form of a cream, emulsion, gel, ointment, lotion, spray, solution, dry powder or a tablet.

Further provided herein is a dietary supplement comprising a dry extract of organic humified material comprising at least the three of fulvic acid, ulmic acid and humic acid, which is characterized by a maximum average particle size of 20 micrometer (µm).

Specifically, the dry extract comprised in the dietary supplement is a micronized dry extract.

Specifically provided herein is use of the dietary supplement as described herein comprising a micronized dry extract of organic humified material, for the nutrition of a human being suffering from a digestive disorder or from poor digestion. Specifically, said nutrition is non-therapeutic nutrition.

Specifically, the dietary supplement is in the form of a lozenge, a chewing gum, a sublingual spray, a solid or semi-solid candy, a tablet, an orally disintegrating tablet, a troche, or an oral film strip.

According to a specific embodiment, the dietary supplement is used to improve the complexion of the skin or to improve digestion. Specifically, the dietary supplement described herein is used to improve digestion by improving colon barrier function and/or reducing inflammation.

Further provided herein is a method of producing a dry extract, specifically a micronized dry extract, of humified organic material comprising at least the two of fulvic acid and humic acid, and optionally ulmic acid, which extract is characterized by a maximum average particle size of 20 micrometer (µm), comprising water-based extraction of an organic humified material, drying the extract, micronizing the extract and fractioning the extract according to the particle size.

Specifically, the humified organic material is selected from the group consisting of peat, shilajit, lignite, coal and compost material.

Specifically, the extract is micronized employing a spiral jet mill.

Specifically, fractioning is by any one or more of precision sieving, air classifier means, specifically dynamic air classifier, or filtration.

According to a further aspect, the extract is sterilized. Specifically, sterilization of the extract comprises the sequential steps of:
 i. heating the extract to at least 95° C. for at least 5 minutes;
 ii. cooling the extract to lower than −20° C. for at least 5 minutes; and
 heating the extract to at least 95° C. for at least 5 minutes.

According to a preferred embodiment, the extract described herein comprises a maximum particle size of 10 µm, even more preferably 8 µm. Specifically, the extract described herein comprises particles of a size no larger than 5, 6, 7, 8, 9, 10, 11, 12, 13, 14, 15, 16, 17, 18, 19 or 20 µm. According to a specific embodiment, the extract is a colloidal dispersion or solution, comprising particles below the detection limit (i.e., no detectable particles), or no particles.

Specifically, the particles comprised in the extract provided herein comprise a hardness on the Mohs scale between 1 and 3. Specifically, said particles comprise a hardness of about 1, 2 or 3, or any in-between the foregoing, on the Mohs scale.

According to a specific aspect of the invention, the absorbent Brunnaer-Emmett-Teller (BET) surface area is at least 0.5 m$^2$/g, preferably it is at least 1.0 m$^2$/g. Specifically, the BET surface area of particles comprised in the extract provided herein is at least any one of 0.6, 0.65, 0.7, 0.75, 0.8, 0.85, 0.9, 0.95, 1.00, 1.01, 1.02, 1.03, 1.04, 1.05, 1.06, 1.07, 1.08, 1.09, 1.10, 1.11, 1.12, 1.13, 1.14, 1.15, 1.16, 1.17, 1.18, 1.19, 1.2, 1.25, 1.30, 1.35, 1.40, 1.45, 1.5, 1.6, 1.7, 1.8, 1.9 or 2 m$^2$/g, or any size in-between the foregoing.

According to a further specific aspect, at least 90%, preferably at least 95% (w/w) of total organic matter of the extract described herein based on a sum weight of humic substances, specifically of any one or more of humic acid, fulvic acid, or ulmic acid, in particular two or the three of humic acid, fulvic acid, or ulmic acid. Specifically, the dry extract described herein comprises at least any one of 90, 90.5, 91.5, 92, 92.5, 93, 93.5, 94, 94.5, 95, 95.5, 96, 96.5, 97, 97.5, 98, 98.5 or 99% humic substances (w/w) based on a sum weight of humic substances, specifically comprising humic acid, fulvic acid, and optionally ulmic acid.

Specifically, at least 90% (w/w) of total organic matter of the dry extract are comprised of fulvic acid and humic acid, and optionally ulmic acid.

Further provided herein is a formulation comprising about 10% (w/w) or more of the extract described herein per total wet weight of the formulation, and a suitable carrier. Specifically, the formulation provided herein comprises up to any one of 0.5, 1.0, 1.5, 2.0, 2.5, 3.0, 3.5, 4.0, 4.5, 5.0, 5.5, 6.0, 6.5, 7.0, 7.5, 8.0, 8.5, 9.0, 9.5 or 10% (w/w) of the extract described herein. Preferably, it comprises about any one of 1, 2.5, 5 or 10% (w/w) of the extract described herein.

Specifically, the formulation described herein comprises a cosmetically or pharmaceutically acceptable carrier.

According to a specific embodiment, the formulation described herein comprises a solvent, a solubilizing agent, an emulsifier and/or a viscosity controlling agent. Specifically, the formulation comprises any one or more of water, alcohol, glycerin, and carbomer.

According to a further specific embodiment, the formulation described herein comprises one or more of oils, essential oils, fats, aromas and/or perfumes.

Specifically, the formulation described herein is provided in the form of a cream, emulsion, gel, ointment, lotion, spray, solution dry powder or tablet.

According to a specific embodiment, the formulation comprises the extract described herein in a mixture with other components, such that the particles comprised in the extract are still detectable in the formulation.

Yet, according to an alternative specific embodiment, the formulation may be such that the particles are no more detectable or present in the formulation e.g., dissolved in the carrier or solvent comprised in the formulation.

FIGURES

FIG. 1: "Alpine Heilmoor" Extract Flow Chart of the Extraction Process.

Figure 2:
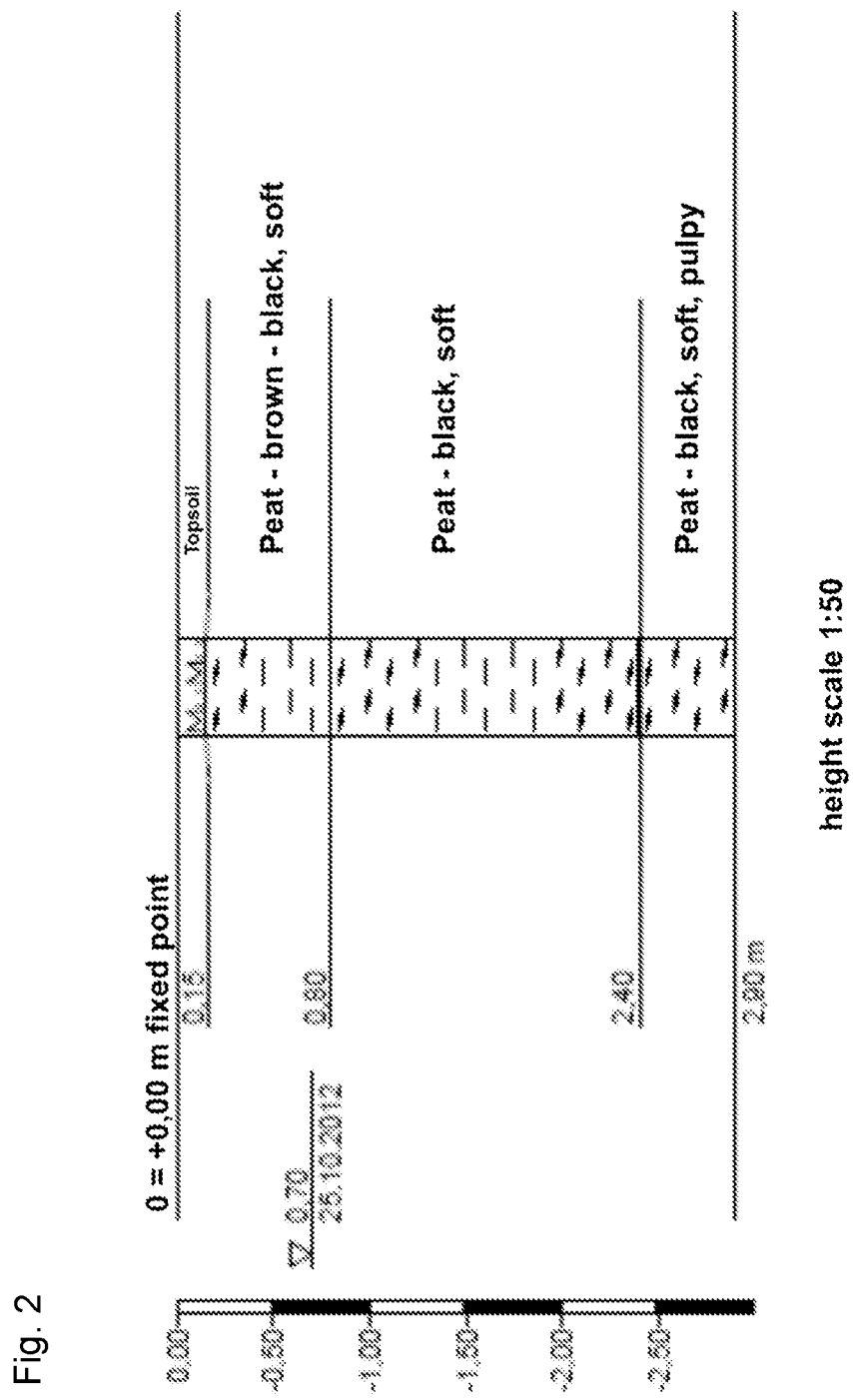

FIG. 2: Drilling Profile.

Figure 3:
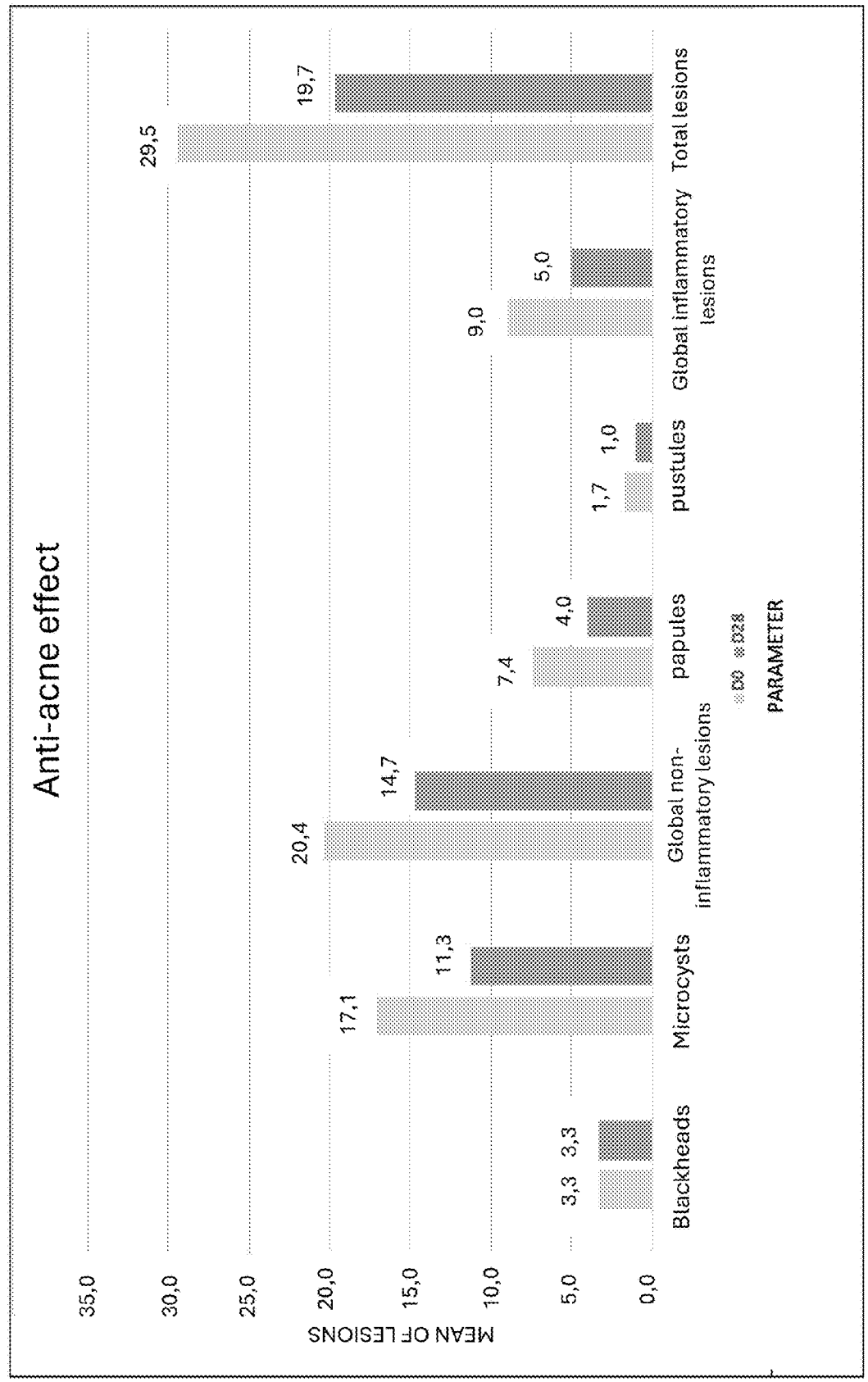

FIG. 3: Summary of results of anti-acne effect.

FIG. 4: Summary of results of immediate soothing effect. (A) Decrease in the stinging intensity, (B) decrease in the stinging duration.

FIG. 5: Summary of the results of preventive soothing effect following 28 days of use of the formulation.

FIG. 6: Clinical Grading results of radiance under eye following 28 days of use of the formulation.

FIG. 7: Summary of the results of anti-aging effect. Variation of the skin biomechanical properties in comparison with the initial state.

Figure 8:
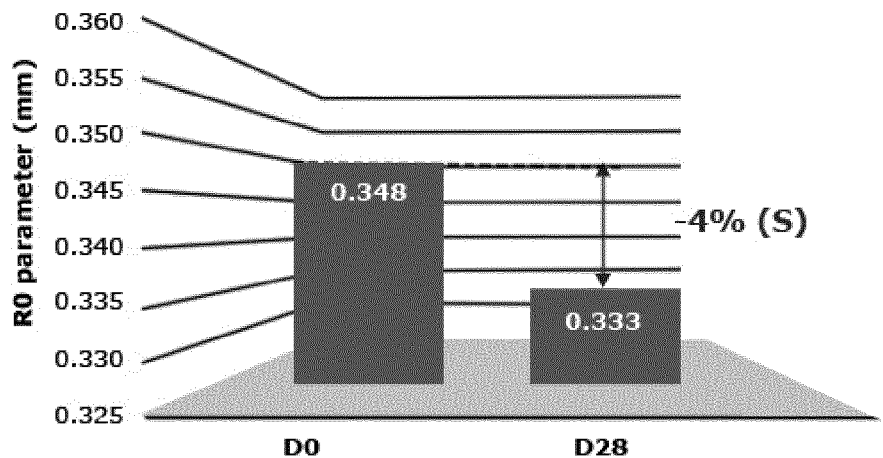
Figure 8:
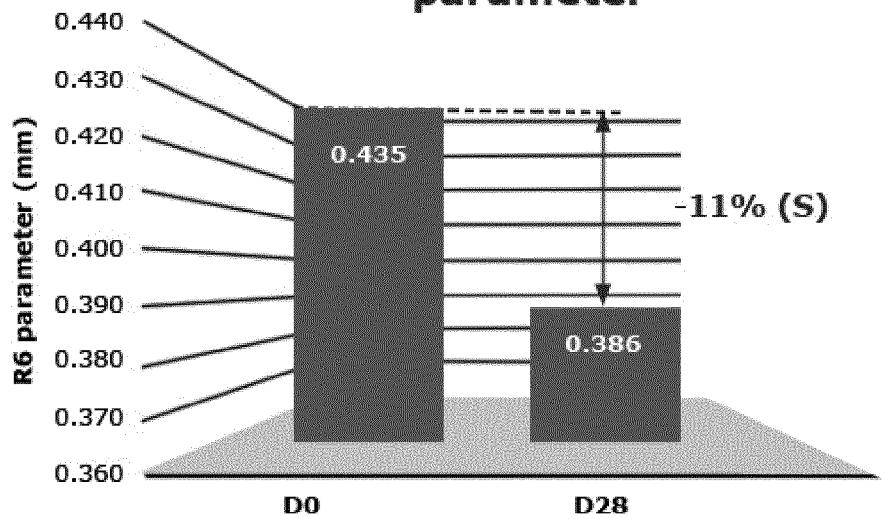
Figure 8:
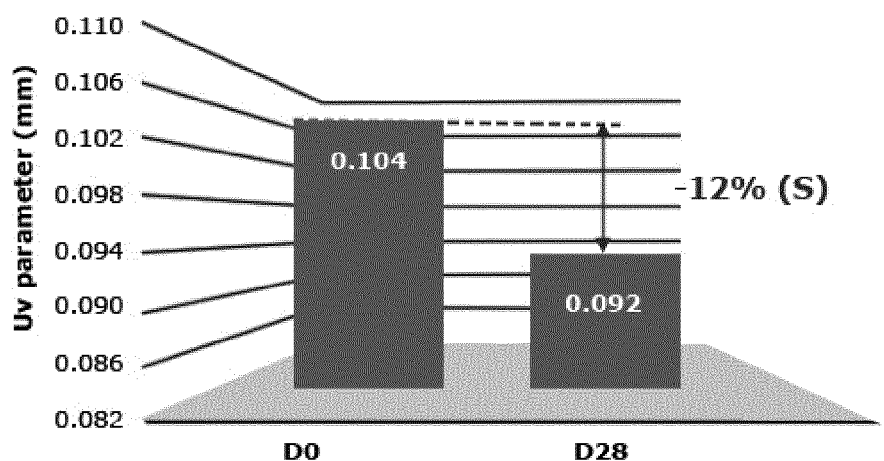

FIG. 8: Graphical depiction of the (A) firming effect and (B) anti-aging effect, decrease in the R6 parameter and (C) anti-aging effect, decrease in the Uv parameter.

FIG. 9: Summary of the results of moisturizing effect. (A) Variation of the cutaneous hydration rate in comparison with the initial state, (B) graphical representation thereof.

Figure 10:
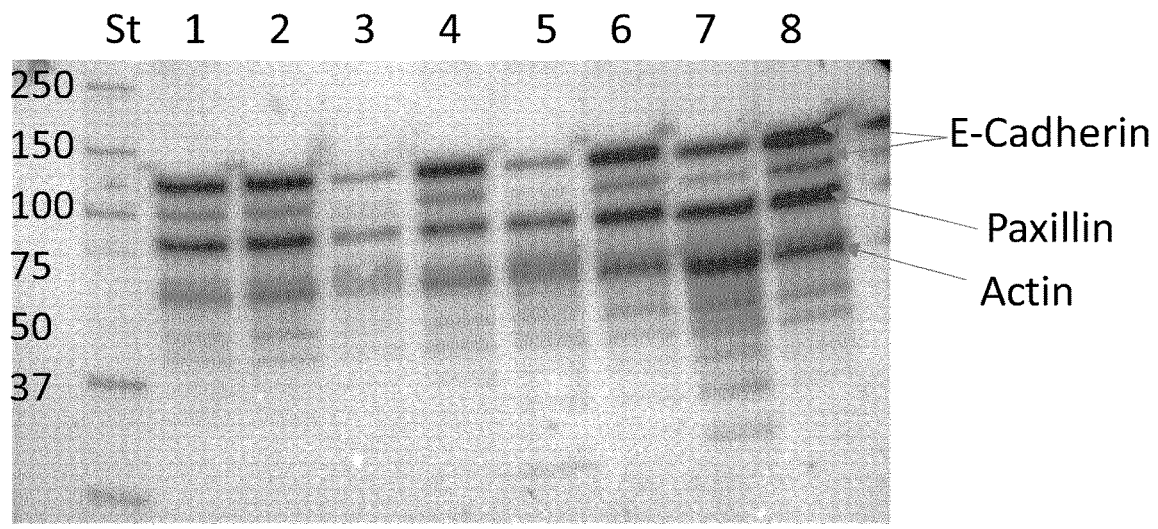
Figure 11:
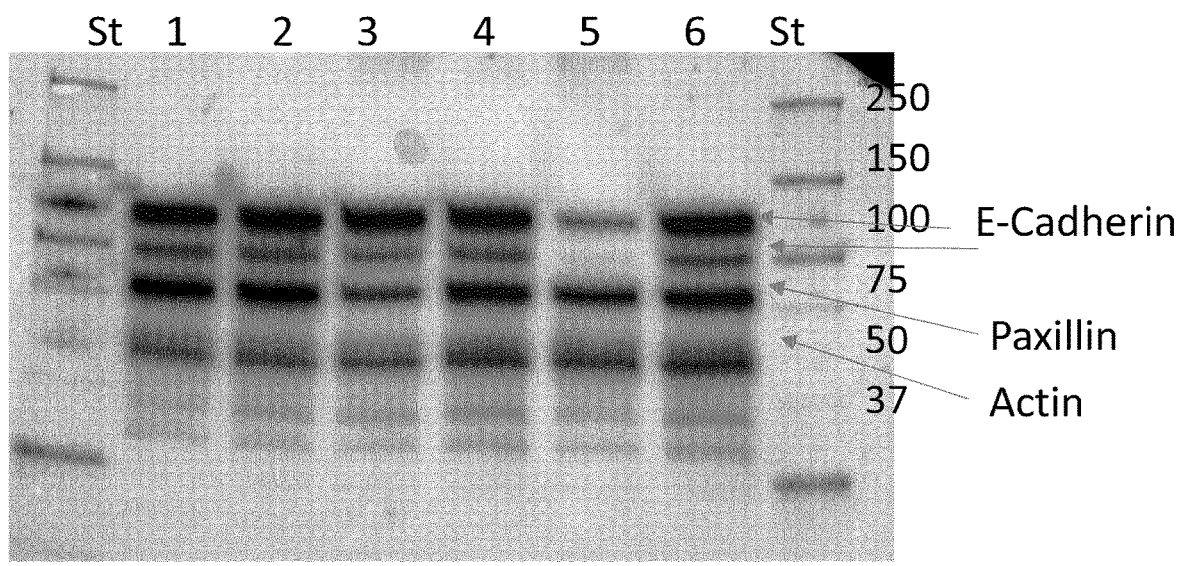

FIG. 10: HaCat cells were cultured as described. 72h after mechanical disruption, cells were lysed (PBS/1% Triton X100, 30 min, 4° C.) and subsequently subjected to SDS-PAGE/Western Blotting. Cell adhesion markers were determined with specific antibodies directed towards cell adhesion markers E-Cadherin and Paxillin. Reactivities were normalized using an antibody directed against the housekeeping protein Actin. FIG. 10 shows the following settings: (St) Protein molecular weight standard, (1) HaCat Monolayer scratched (HMS)→regeneration in culture medium (CM); (2) HaCat Monolayer not scratched (MMNS)→regeneration in CM, (3) HMS→regeneration in presence of 1% charcoal (CH), (4) HMNS→regeneration in presence of 1% CH, (5) HMC→regeneration in presence of 1% fulvic acid (FA), (6) HMNC→regeneration in presence of 1% FA, (7) HMS→regeneration in presence of EGF, (8) HMNS-→regeneration in presence of EGF FIG. 11: HaCat cells were cultured as described. 72h after mechanical disruption, cells were lysed (PBS/1% Triton X100, 30 min, 4° C.) and subsequently subjected to SDS-PAGE/Western Blotting. Cell adhesion markers were determined with specific antibodies directed towards cell adhesion markers E-Cadherin and Paxillin. FIG. 11 shows the following settings: (St) Protein molecular weight standard, (1) HaCat Monolayer scratched (HMS)→regeneration in culture medium (CM); (2) HaCat Monolayer not scratched (MMNS)→regeneration in CM, (3) HMS→regeneration in 1% AHE, (4) HMNS→regeneration in 1% AHE, (5) HMS-→regeneration in 5% AHE, (6) HMNS→regeneration in 5% AHE FIGS. 12A and 12B: HaCat cells were cultured as described. Upon creating a dense monolayer a cross formed scratch was created using a mechanical device. Upon injuring the monolayer cells were treated with the indicated stimuli for 72h. Cultures were documented by photograph directly after the injury and after 72h. After the documentation cells were lysed and subjected to SDS-PAGE/Western Blotting.

Figures 12B, 13:
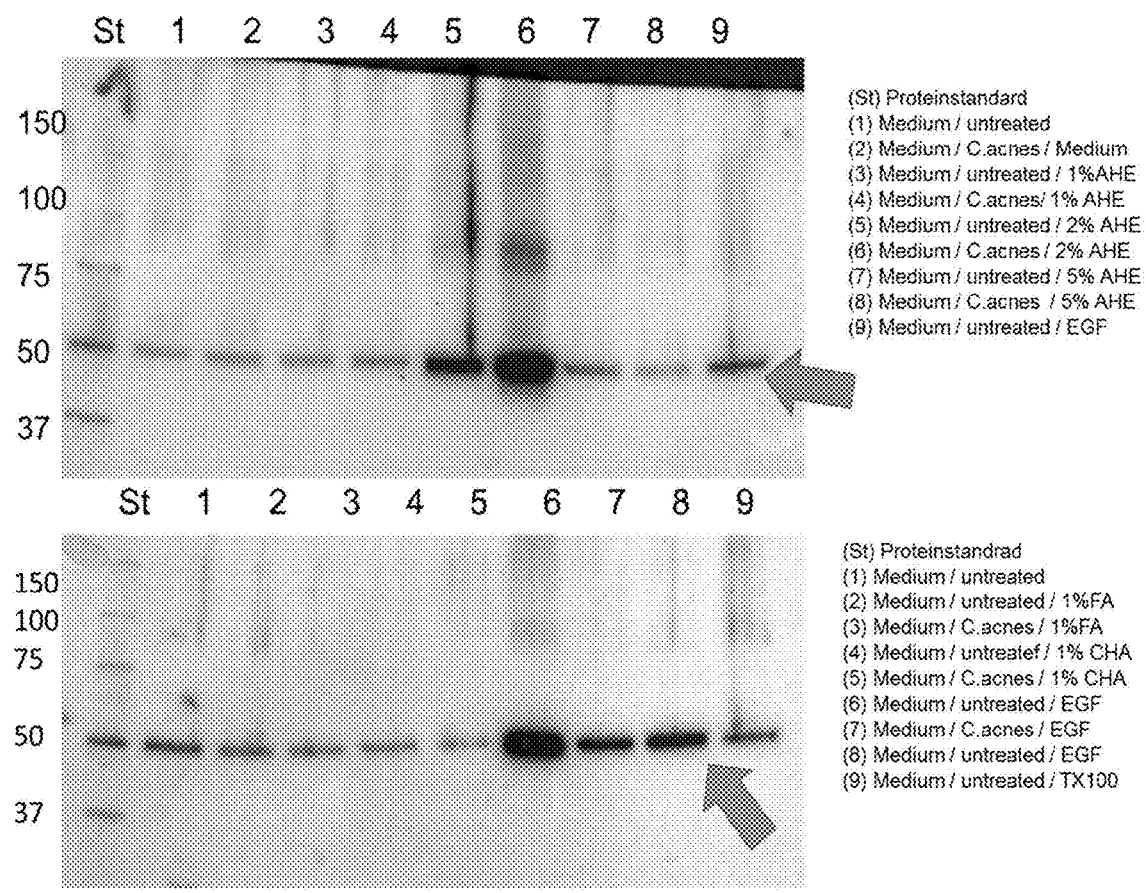

FIG. 13: Western Blot Analysis with anti-Cytokeratin 10 was performed as described. The primary antibody (Keratin 10 (KRT10): Cusabio Technology CSB-PA445987) was used in a dilution of 1:1000. After the primary incubation step binding of the primary antibody was visualized with an anti-rabbit-IG conjugated to horse raddish peroxidase. Detection of Cytokeratin-10 with an apparent MW of 58 kDa was visualized using the ECL Technology in combination with a BioRad Gel documentation system.

Figure 14:
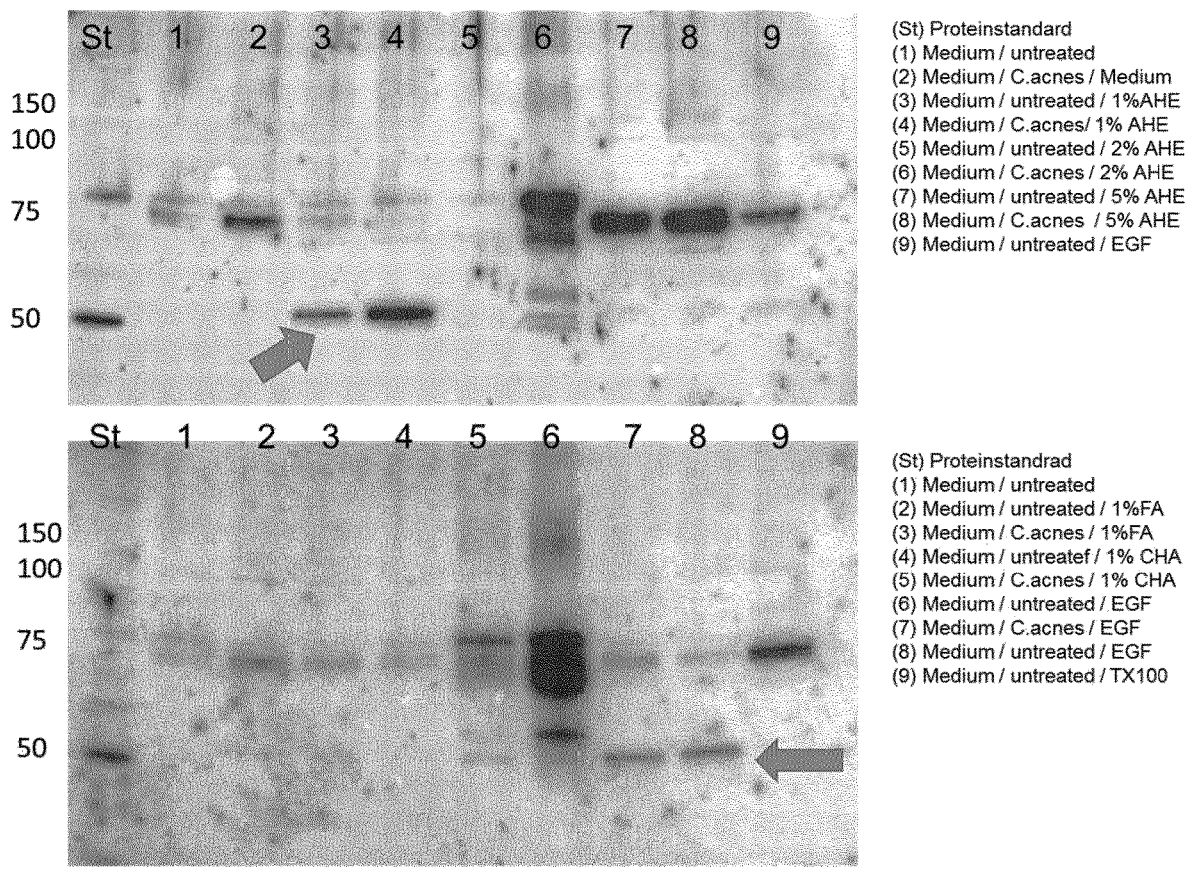

FIG. 14: Western Blot Analysis with anti-Cytokeratin 16 was performed as described. The primary antibody (Keratin 16 (KRT16): Cusabio Technology CSB-PA012515LA01Hu) was used in a dilution of 1:500. After the primary incubation step binding of the primary antibody was visualized with an anti-rabbit-IG conjugated to horse raddish peroxidase. Detection of Cytokeratin-16 with an apparent MW of 51 kDa was visualized using the ECL Technology in combination with a BioRad Gel documentation system.

Figure 15:
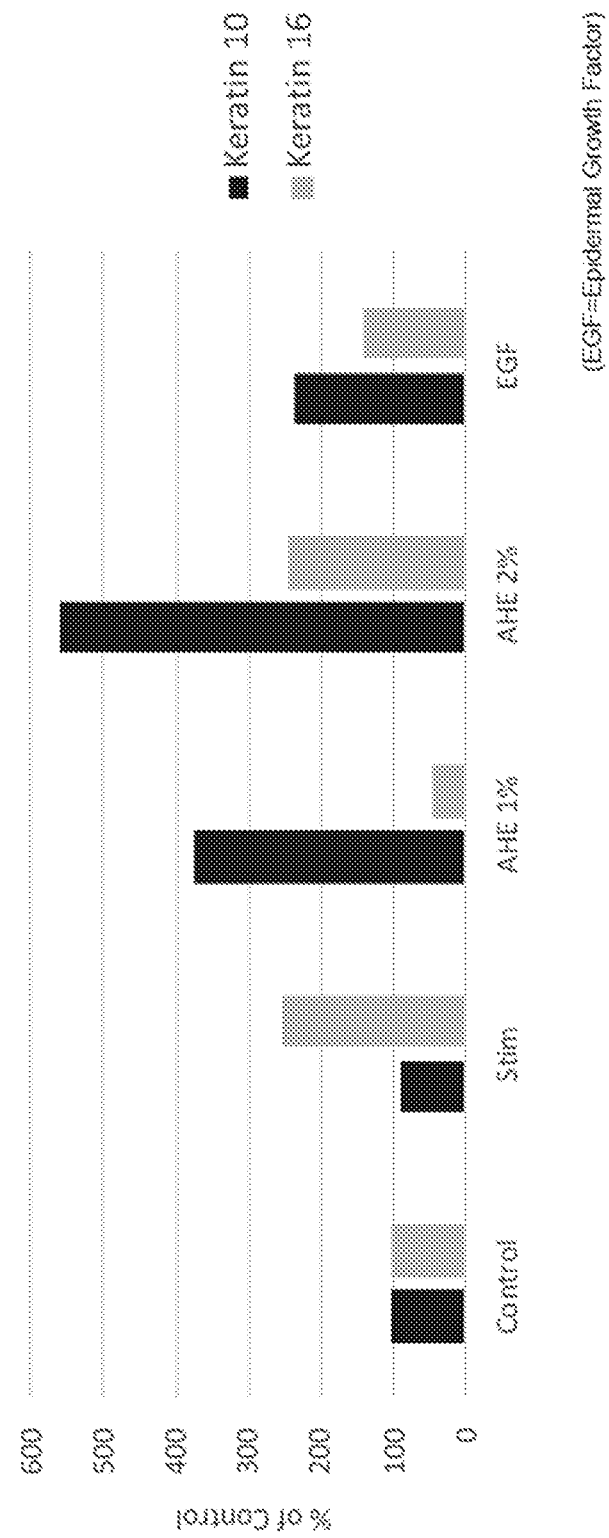

FIG. 15: Quantification of western blot results of FIGS. 13 and 14.

Figure 16:
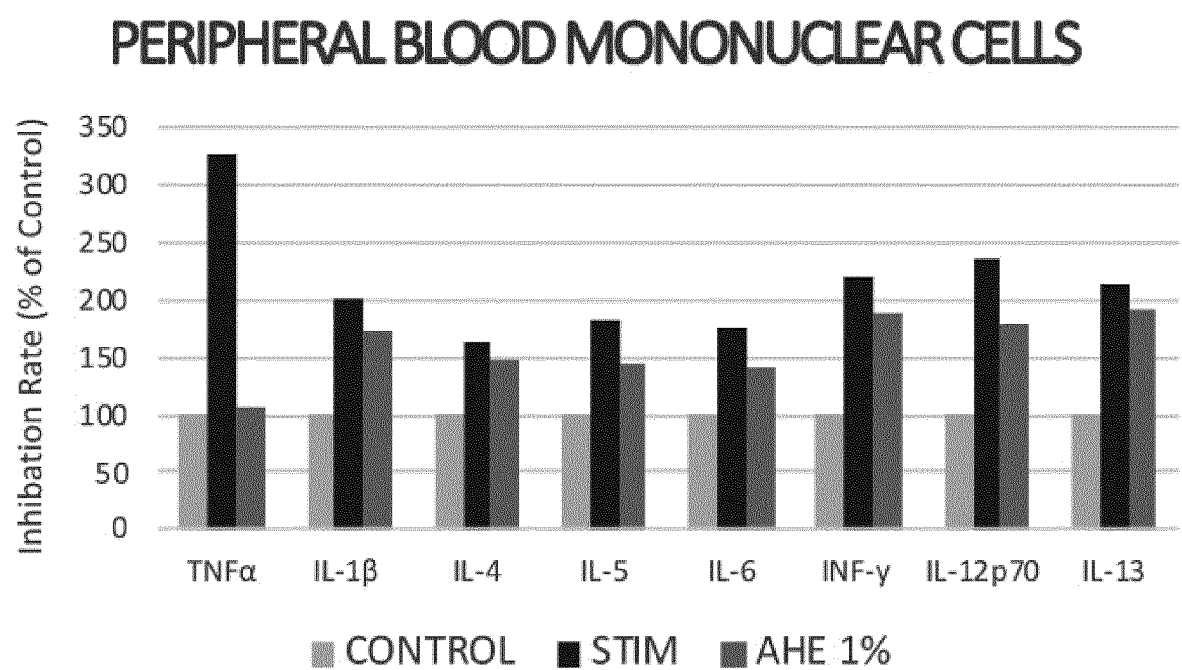

FIG. 16: Graph representing results from Tables 11-21. Bars show Expression levels of inflammatory cytokines in CaCo cells stimulated with *C.acnes* (STIM), and treated with AHE 1%. Control shows baseline expression (unstimulated).

Figure 17:
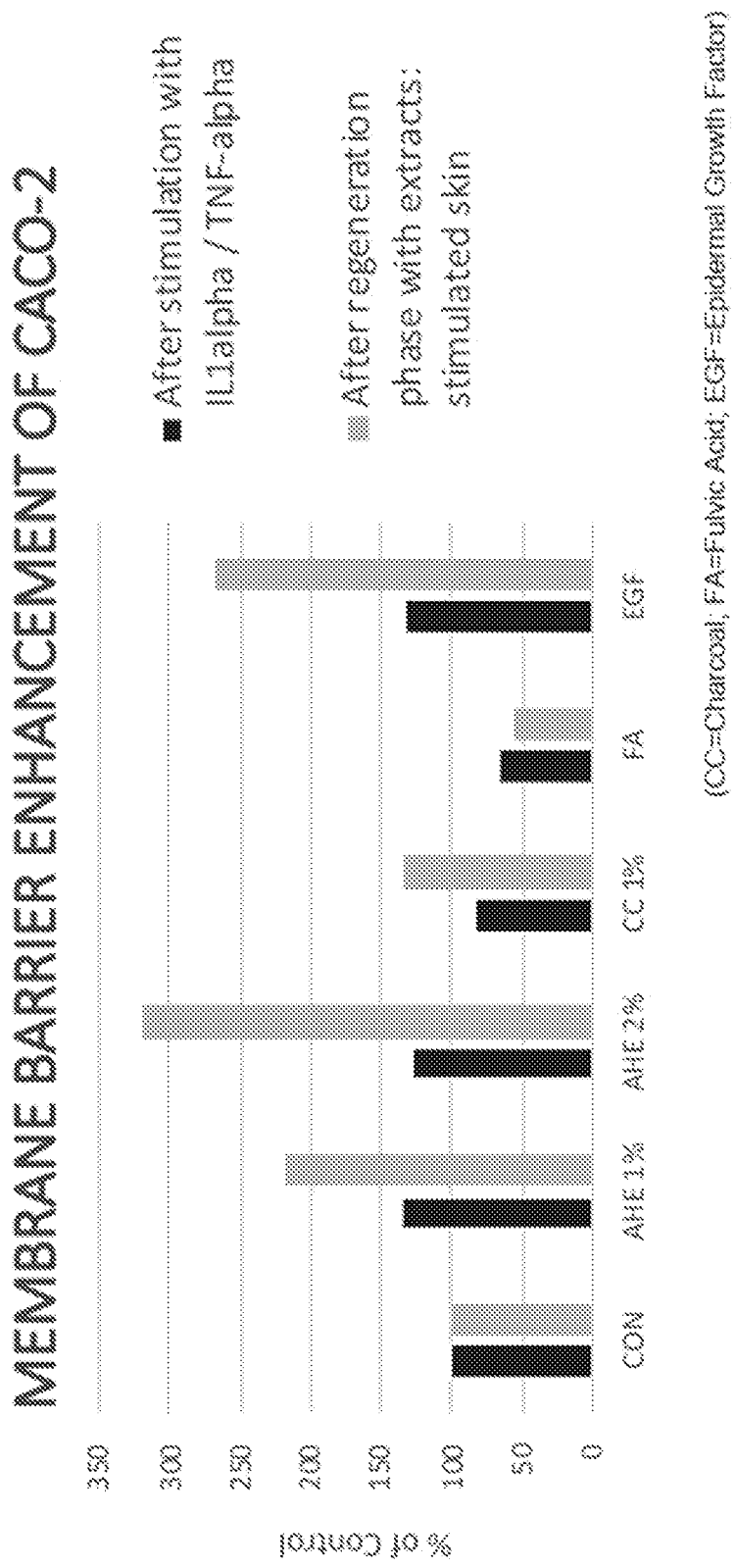

FIG. 17: Graph shows TEER value of CaCo cells 1 day after stimulation with IL1alpha/TNF-alpha (D15) and after the regeneration phase comprising treatment with AHE extracts (D17).

Figure 18:
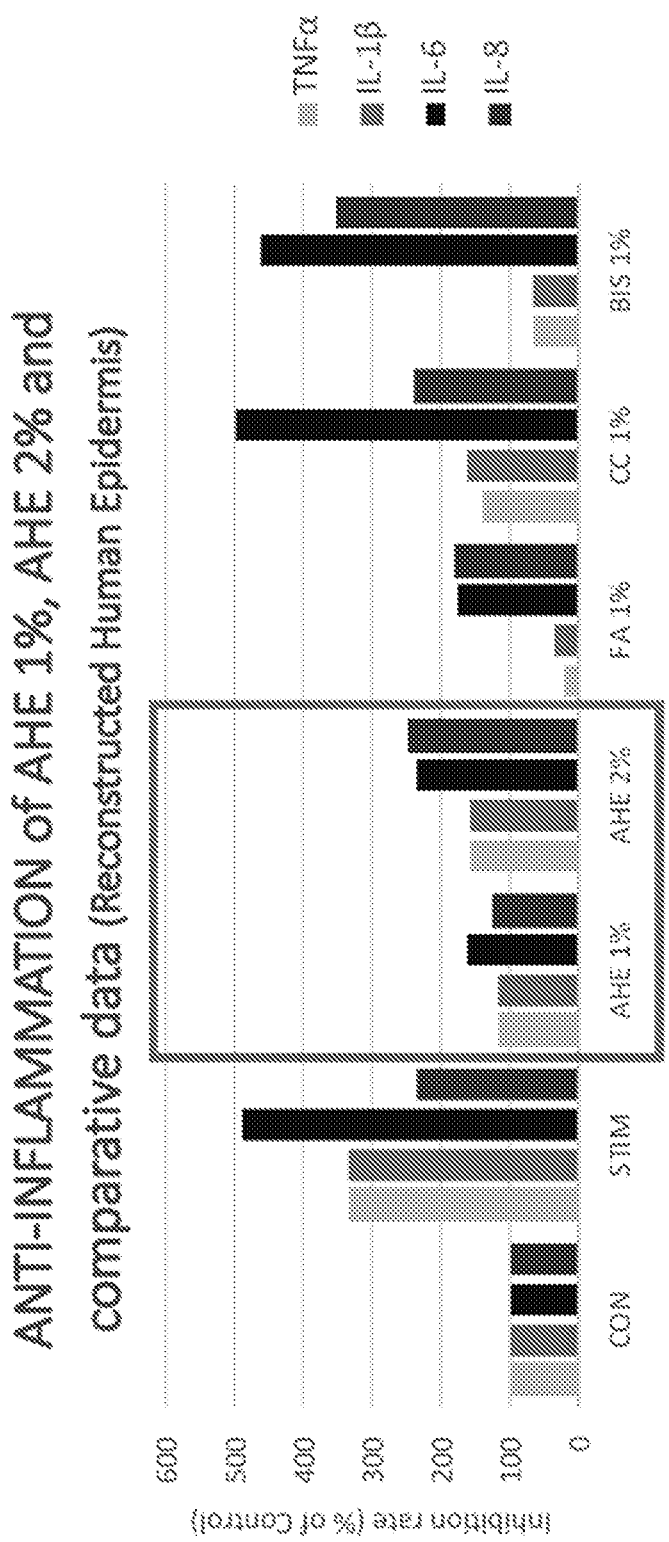

FIG. 18: Graph shows inhibition rate (in % of control) of inflammatory factors TNF-α, IL-16, IL-6 and IL-8 by AHE 1% and AHE 2% and compared to fulvic acid 1% (FA 1%), charcoal 1% (CC 1%) and bisabolol 1% (BIS 1%).

Figure 19:
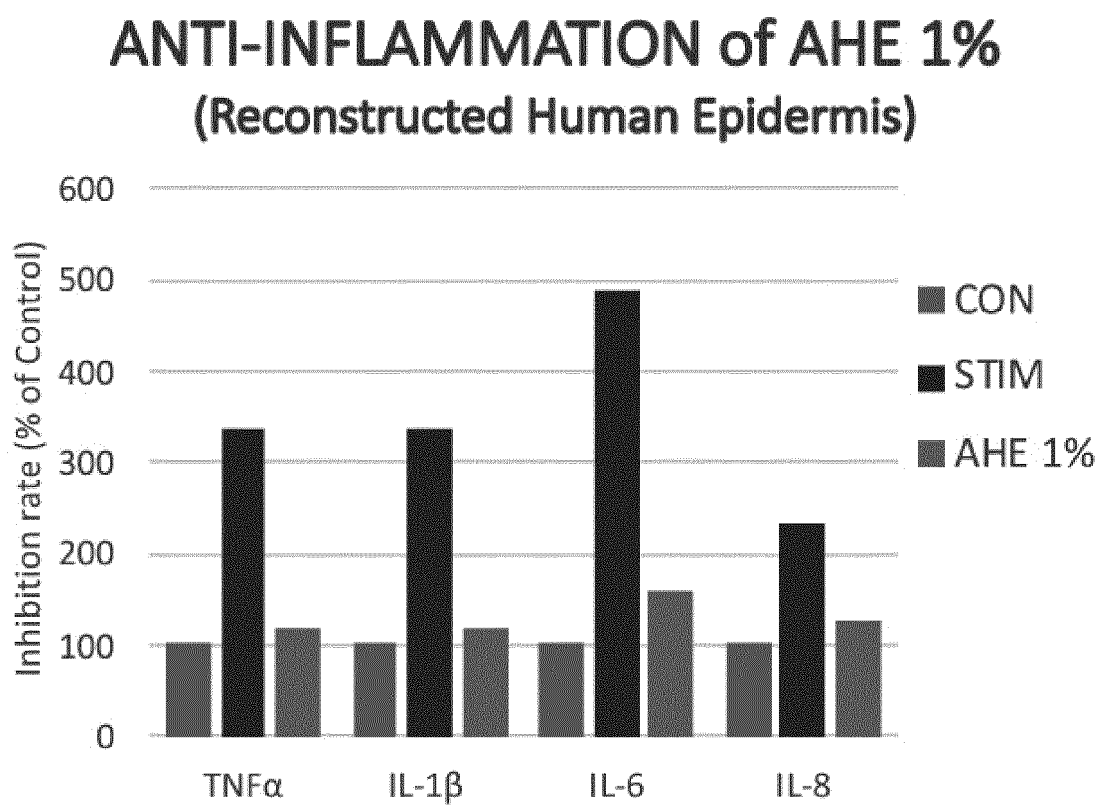

FIG. 19: Graph shows inhibition rate (in % of control) of inflammatory factors TNF-α, IL-16, IL-6 and IL-8 by AHE 1%.

Figure 20:
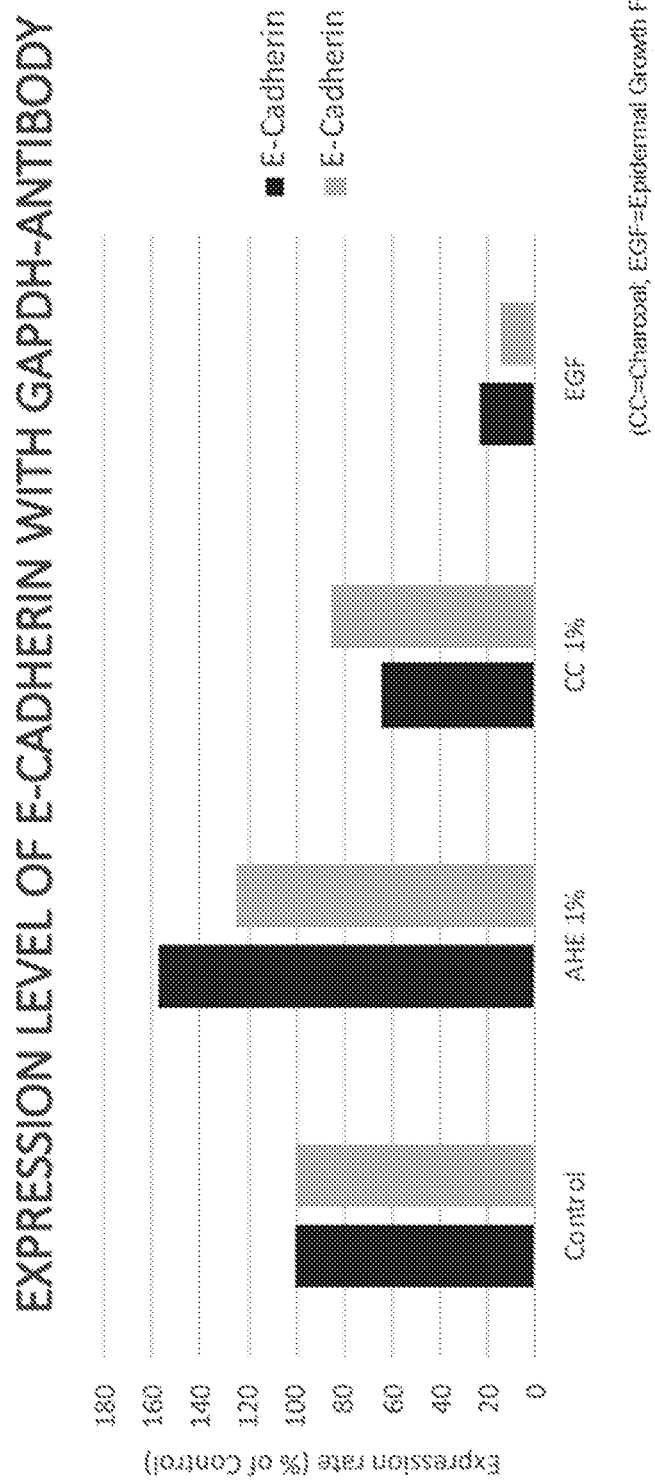

FIG. 20: Quantification of western blot results of FIG. 11.

DETAILED DESCRIPTION

Unless indicated or defined otherwise, all terms used herein have their usual meaning in the art, which will be clear to the skilled person. Specific terms as used throughout the specification have the following meaning.

Unless indicated otherwise, the term "about" as used herein refers to the same value or a value differing by up to +/−5% of the given value.

To provide a more concise description, some of the quantitative expressions given herein are not qualified with the term "about". It is understood that whether the term "about" is used explicitly or not, every quantity given herein is meant to refer to the actual given value, and it is also meant to refer to the approximation to such given value that would reasonably be inferred based on the ordinary skill in the art, including approximations due to the experimental and/or measurement conditions for such given value.

The terms "comprise", "contain", "have" and "include" as used herein can be used synonymously and shall be understood as an open definition, allowing further members or parts or elements. "Consisting" is considered as a closest definition without further elements of the consisting definition feature. Thus "comprising" is broader and contains the "consisting" definition.

As used herein, the term "subject" or "individual" or "patient" shall refer to a warm-blooded mammalian, particularly a human being.

The term "patient" includes mammalian, specifically human, subjects that receive either prophylactic or therapeutic treatment or are at risk of or diagnosed of a specific disease or disorder, particularly those conditions as further described herein.

As used herein, the term "organic humified material" refers to any organic or biological source material comprising humic substances, which source is typically naturally occurring. The humic substances described herein can be isolated from any organic humified source including, but not limited to, peat, shilajit, compost material, lignite (brown coal), leonardite, humilite, organic clays, soil (humus), lakes/rivers, and other sources known to exist in natural geological formations, or that can be produced by known methods from organic biowaste materials, such as agricultural, animal and human materials, by various refining processes. Humic substances are ubiquitous in nature and arise from the decay of plant and animal residue in the environment. They are among the most widely distributed natural products on the surface of the earth, and are the major organic components of soil (humus), lakes, rivers and geological deposits such as peat, leonardite, lignite (brown coal) and organic clays. A specifically preferred organic humified material is peat.

Humic substances are typically understood as a mixture of many different molecules, some of which are based on a motif of aromatic nuclei with phenolic and carboxylic substituents, linked together. Specifically, humic substances are understood to comprise any one or more of fulvic acid, humic acid, and ulmic acid.

Specifically, the organic humified source material referred to herein comprises at least any one of 8, 9, 10, 11, 12, or 13% (w/w), or more total organic matter in the dry substance, preferably it comprises about 12% (w/w) total organic matter. Specifically, said total organic matter comprises at least any one of 50, 51, 52, 53, 54, 55, 56, 57, 58, or 59%, preferably at least 60 or 61% humic acid (w/w) in the dry substance. Specifically, the organic humified source material referred to herein comprises at least any one of 15, 16, 17, 18, 19, or 20%, preferably at least 21 or 22% (w/w) fulvic acid in the dry substance. Specifically, the organic humified source material referred to herein comprises at least any one of 5, 6, 7, or 8%, preferably at least 9 or 10% (w/w) ulmic acid in the dry substance.

Specifically, the dry extract described herein comprises about 50 to 72% (w/w) humic acid. Specifically, the dry extract described herein comprises about 20 to 35% (w/w) fulvic acid. Optionally, the dry extract described herein comprises about 8 to 10% (w/w) ulmic acid.

Various extraction methods, e.g. oxidation steps, heat treatment, microbial digestion steps, or electromagnetic fields, may be employed to extract humic substances from organic humified materials.

As used herein, the term "extract of organic humified material" refers to a composition of substances contained therein, which is obtainable or obtained upon extracting organic humified material as described herein using an extractant which is pure water or an aqueous solution ("water-based extraction"), including inorganic and/or organic substances in water or an aqueous solvent. Such extract is herein also referred to as aqueous extract or water-based extract, which is optionally dried to provide a dry extract.

A specifically preferred aqueous extract described herein is obtainable by using water or an aqueous solvent at a pH ranging between about 4 and 6, specifically between about 4.5 and 5.7. Specifically, the water or aqueous solvent used to obtain the extract described herein has a pH of at least 4, 4.1, 4.2, 4.3, 4.4, 4.5, 4.6, 4.7, 4.8, 4.9 or 5.0. Specifically, the water or aqueous solvent used to obtain the extract described herein has a pH of less than 6.0, 5.9, 5.8, 5.7, 5.6, 5.5, 5.4, 5.3, 5.2, 5.1 or 5.0.

Specifically, an extractant can be an aqueous solution which is a liquid preparation that contains one or more chemical substances dissolved, i.e., molecularly dispersed, in a suitable solvent or mixture of mutually miscible solvents, wherein the predominant solvent is water. Specific examples of aqueous solutions are any one of base solutions, acid solutions or salt solutions. Exemplary aqueous solutions may comprise hydrochloric acid, acetic acid, nitric acid, sodium hydroxide, potassium hydroxide, magnesium hydroxide, calcium hydroxide, sodium chloride, potassium chloride, and/or magnesium chloride. According to a preferred embodiment, the extractant is water, thus yielding a water extract.

The extract described herein specifically comprises each of the two humic substances fulvic acid and humic acid, and optionally ulmic acid, particularly comprised as a mixture in one composition. Specifically, the extract described herein is substantially free of non-humic anorganic or organic substances that are present in the source material. The extract is "substantially free" of the non-humic substances when there is less than about any one of 30%, 20%, 10%, or 5% or less, and preferably less than any one of 1, 0.5, 0.1, 005, or 0.001%, (w/w), of the non-humic substances by dry weight. Specifically, the extract is substantially free from heavy metals or heavy metal ions herein also referred to herein as "contaminating substances" which are e.g., heavy metals of arsenic, lead, chromium, or mercury.

As used herein, the term "humic acid" refers to humic substance or a fraction of humic substances that is not soluble in water at low pH, e.g., below about 2, but soluble at higher pH, e.g., about 6 or higher. It is insoluble in an acid solution, methyl ethyl ketone and methyl alcohol, but is soluble in an alkali solution. Humic acid comprises a mixture or collection of different acids containing carboxyl and phenolate groups, some of which are based on a motif of aromatic nuclei with phenolic and carboxylic substitutions that are linked together. Humic acid can have one or more of quinone, phenol, catechol and sugar moieties. The structures of humic acid proposed in the literature contain free and bound phenolic OH groups, quinine structures, nitrogen and oxygen as bridge units and COOH groups placed variously on aromatic rings (Stevenson F. J., 1982, Humus Chemistry: Genesis, Composition, Reactions, John Wiley & Sons, Interscience 443p. New York 1982). Some of the proposed structures have been disclosed in F. J. Stevenson (1994) Humus Chemistry: Genesis, Composition, Reactions, John Wiley & Sons, New York.

Humic acid behaves functionally as a dibasic acid or tribasic acid. It can form complexes with ions such as $Mg^{2+}$, $Ca^{2+}$, $Fe^{2+}$ and $Fe^{3+}$. As used herein, the term "humic acid" encompasses the esters, salts or ion complexes of humic acid. When the cation exchange sites on humic acid molecules are filled predominately with an element other than hydrogen, the humic acid molecules are called humates. In general, humates of a monovalent inorganic or ammonium ionic nature are stable in water, but humates of a multivalent cation nature are unstable.

Specifically, humic acid containing compositions such as those obtained by water extraction by a method described herein, are true colloidal, i.e. they do not dissolve in water, and remain as electrically suspended molecules, dispersion or clusters of particles.

Specifically, a humic acid containing composition described herein contains colloidal particles with an average particle size of up to 20 µm, preferably about 1 to 10 µm.

Specifically, humic acids are understood as organic substances extracted from soil that coagulate (i.e. form small solid particulate material) when a strong-base extract is acidified, whereas fulvic acids are understood as organic acids that remain soluble (i.e. stay dissolved) when a strong-base extract is acidified.

As used herein, the term "fulvic acid" refers to humic substance or a fraction of humic substances that is soluble in water under all pH conditions. It is also soluble in methyl ethyl ketone, methyl alcohol and acids. It generally has a yellow (*fulvus*) to yellow-brown color. Fulvic acid comprises a mixture or collection of different acids containing carboxyl and phenolate groups. The proposed structure of fulvic acid contains both aromatic and aliphatic structures that are extensively substituted with oxygen-containing functional groups. A previously proposed FA structure is illustrated Buffle J., et al. 1977, Measurements of Complexation Properties of Humic and Fulvic Acids in Natural Water, With Lead & Copper Ion—Selective Electrodes. Anal. Chem. 49: 216-222. As used herein, the term "fulvic acid" encompasses the esters, salts or ion complexes of fulvic acid.

Specifically, fulvic acid is dissolved in compositions such as those obtained by water extraction by a method described herein, in particular fulvic acid molecules of about 1 to several angstroms in size in a highly electrically charged ionic, nano-crystalline solution.

As used herein, the term "ulmic acid" refers to humic substance or a fraction of humic substances that is soluble in alkali and methyl ketone, but is insoluble in methyl alcohol. The term "ulmic acid" encompasses a mixture or collection of high molecular weight polymers, including the esters, salts or ion complexes of ulmic acid.

Ulmic acid together with ammonia typically occurs in black soil. Diluted acids transform the brown matter into humic acid, thus, ulmic acid is herein also understood as a subfraction of humic acid.

Peat soil primarily consists of the humic substances comprising humic acid and ulmic acid in the form or humin and ulmates.

Specifically, ulmic acid containing compositions are true colloidal, i.e. they do not dissolve in water, and remain as electrically suspended molecules, dispersion or clusters of particles.

Specifically, an ulmic acid containing composition described herein contains colloidal particles with an average particle size of up to 20 µm, preferably about 1 to 10 µm.

According to a specific embodiment, the fulvic acid component comprised in the extract described herein comprises or consists of fulvic acid molecules having a molecular weight range of about 150 to about 1,300 dalton.

According to a specific embodiment, the humic acid component comprised in the extract described herein comprises or consists of humic acid molecules having a molecular weight range of about 3,000 to about 160,000 dalton, or about 3,000 to about 100,000 dalton, or about 3,000 to about 50,000 dalton.

According to a specific embodiment, the ulmic acid component comprised in the extract described herein comprises or consists of ulmic acid molecules having a molecular weight range of about 50,000 to about 160,000 dalton.

Each of the humic substance components, such as humic acid, fulvic acid and ulmic acid, can be qualitatively or quantitatively determined in an extract of humified material according to methods known to the person skilled in the art. According to a specific example, they can be determined as follows: The dry extract described herein is heated with 2% HCl under reflux. The resulting residue is extracted several times using NaOH, specifically 0.5% NaOH. The extracts are combined and acidified with diluted HCl to precipitate the humic substance fraction (comprising humic acid, fulvic acid and optionally ulmic acid). The precipitate is filtered off, washed, dried and weighed. After treatment with acetyl bromide, the humic substances remains in the residue, and can be further quantitatively determined by suitable means e.g., weighing.

As used herein, the term "peat" refers to any partly decayed organic material that formed by the partial decomposition of vegetable matter under wet, acidic conditions. Typically, peat is formed in natural areas called peatlands, bogs, mires, moors, or muskegs, over long periods of time. Preferably, the peat material is isolated from bogs or marshes that are at least between 1.000 and 3.000 years old. Preferably, the peat material is isolated from the soil at a depth between 2 and 4 meters, even more preferably between 2.4 and 3.7 meters. Peat comprises humic substances, which develop during decomposition of organic matter in humus, the major organic fraction in peat. Humic substances are the most stable fraction of organic substances in soils. The typically dark colour comes from quinine structures.

Specifically, peat used to produce the extract described herein comprises at least any one of 8, 9, 10, 11, 12, or 13% (w/w) or more organic matter in the dry substance, preferably it comprises about 12% (w/w) organic matter. Specifically, said organic matter comprises at least any one of 50, 51, 52, 53, 54, 55, 56, 57, 58, or 59%, preferably at least 60 or 61% humic acid (w/w) in the dry substance. Specifically, peat used to produce the peat extract described herein comprises at least any one of 15, 16, 17, 18, 19, or 20%, preferably at least 21 or 22% (w/w) fulvic acid in the dry substance. Specifically, peat used to produce the peat extract described herein comprises at least any one of 5, 6, 7, or 8%, preferably at least 9 or 10% (w/w) ulmic acid in the dry substance.

According to a specific embodiment, the extract provided herein is a dry extract. The term "dry extract" is herein understood to refer to a composition based on, comprising or consisting of an extract which comprises less than about 5% (w/w) water, and preferably less than about any one of 4, 3, 2 or 1% (w/w) water, by weight of the extract. The term "dry extract" is specifically understood to refer to any aqueous or water extract which is dried upon extraction with water or the aqueous solvent. According to a specific example, a dry extract is provided by first producing an aqueous extract followed by drying to obtain a dry composition, ready for use in the preparation of suitable formulations for cosmetic, pharmaceutic or dietary use.

The dry extract can be reconstituted by mixing with water or an aqueous solvent to an aqueous dispersion or solution, or else by mixing with fatty or oily carriers to a fatty and oily formulation, respectively. It is specifically understood that the term "dry extract" encompasses the dried extract material, or the material reconstituted from the dry extract, which reconstituted material comprises such components comprised in the dry extract.

The extract described herein, is specifically characterized by a maximum average particle size of 20 µm. Specifically, the particles are colloidal particles upon reconstituting the dry extract to a dispersion. Specifically, the extract comprises an average particle size of up to any one of 20, 19, 18, 17, 16, 15, 14, 13, 12, 11, 10, 9, 8, 7, 6, 5, 4 or 3 µm. Specifically, the extract described herein comprises a maximum average particle size of less than 20, 19, 18, 17, 16, 15, 14, 13, 12, 11, 10, 9, 8, 7, 6, 5, 4 or 3 µm.

The term "size" is used herein to describe diameter or average diameter of a particle, which may vary, depending upon the morphology of the individual particle. In an example, the respective particle can have a morphology that is substantially spherical. A substantially spherical particle (e.g., spherical or near-spherical) has a sphericity of >0.84. Thus, any individual particles having a sphericity of <0.84 are considered non-spherical (irregularly shaped). The particle size of the substantially spherical particle may be provided by its diameter, and the particle size of a non-spherical particle may be provided by its average diameter (i.e., the average of multiple dimensions across the particle) or by an effective diameter, which is the diameter of a sphere with the same mass and density as the non-spherical particle.

The term "average" with respect to a particle size distribution is herein understood to refer to the median of the particle size comprised in an extract described herein.

The average particle size contained in an extract described herein may be determined using e.g. laser light diffraction, Raman chemical imaging, as well as microscopy. According to a specific example, the average particle size is determined using static light scattering, dynamic image analysis, or static light scattering combined with dynamic image analysis.

Specifically, exploiting static light scattering, the average particle size can be determined by emitting short wave light from a laser source which hits the particles to be characterized in dispersion and is elastically scattered at them. This scattering is measured in forward, sideways and backward scattering with the help of permanently installed detectors, thereby determining the size of particles comprised in the extract described herein. According to a further specific example, static light scattering can be combined with dynamic image analysis, wherein particles are photographed and statistically evaluated with one or more high-speed cameras, thereby also allowing particle shape analysis.

Specifically, the BETTERSIZER S3 Plus from 3P Instruments may be used to determine the average particle size described herein.

The formulations described herein, in particular those provided for cosmetic or pharmaceutical use, are typically topical formulations, such as used for topical treatment on skin, hair or mucosa, in particular oral mucosa.

Skin treatment or mucosal treatment, in particular oral mucosal treatment, typically comprises skin or mucosal absorption, respectively, which is a route by which substances can enter the body through the skin and mucosa, respectively. Absorption of substances through the skin or mucosa depends on several factors, specifically skin and mucosal tissue is limited regarding size of particles that can be absorbed. The small particle size of the extract or composition as described herein surprisingly turned out to be a particular advantage. Specific formulations described herein such as used in dermatologic applications are topical formulations, e.g. applied to the surface of skin, hair or mucosa, and turned out to significantly improve dermatologic disorders or disease, such as for example redness, inflammatory lesions, acne and wrinkles of skin of human beings. Specific topical formulations described herein were found to significantly improve wound healing, reduce stinging and to have an anti-inflammatory and a soothing effect on the skin. Furthermore, formulations described herein were found to improve the skin barrier function, and to improve the human gut barrier.

Consumer acceptability of products, such as foods and personal care products, often depends largely on sensory properties perceived during use. "Descriptive analysis" is a technique that was developed to quantify perceptual properties of samples so that their sensory profiles can be directly compared. Descriptive analysis, although historically applied to food products, has been used to evaluate personal care products, such as lotions, creams, and cosmetics, since the 1970's. A descriptive analysis technique used to evaluate skin care products is a standard practice in the American Society for Testing and Materials (ASTM) entitled "Standard Practice for Descriptive Skinfeel Analysis of Creams and Lotions". The ASTM skin feel analysis is separated into three main evaluation sections: evaluation of the product in a petri dish, evaluation of the product while being rubbed between a finger and thumb (pick-up evaluation), and evaluation of the product being rubbed on the forearm (rub out evaluation).

Specifically, topical skin formulations provided herein which comprise the dry extract characterized by comprising a small average particle size have a better score on the ASTM skin feel analysis and a higher consumer acceptability.

The specific method of producing the extract described herein preferably comprises water-based extraction of an organic humified source material, drying the extract, micronizing the extract and fractioning the extract according to the particle size.

To produce the extract described herein, organic humified source material is typically exposed to an extractant, which is water or an aqueous solution or solvent. The term "exposed" is used to infer that the organic humified material is mixed with the extractant or in some way brought into contact with the extractant to allow extraction of humic substances.

The organic humified material is typically allowed to remain in contact with the extractant for a period of time sufficient to enable the release of humic substances from the organic humified material. Any technique for exposing the organic humified material to the extractant may be used; however, preferably the technique is either batch or continuous flow. Batch techniques involve the use of tanks, optionally equipped with mechanical stirrers. Periodically, the mixture of organic humified material and extractant is stirred to keep the extractant in contact with the material for a time sufficient to obtain a saturated solution of the desired substance or substances in the extracting solvent. The extractant is typically allowed to remain in contact with the material for at least 10 minutes, but preferably at least 2 or 4 hours, e.g., up to 10 hours. The ratio of organic humified material to extraction solvent is typically between 1:1 to 1:100 (w/w), respectively, although different ratios may be used.

Specifically, water-based extraction of organic humified material is performed under pressure greater than atmospheric pressure. Specifically, sufficient pressure is applied to facilitate extraction, e.g. of more than 1 bar, in specific cases applying at least any one of 3, 4, 5, 10, 15, or 20 bar or more.

Specifically, water-based extraction of organic humified material is performed at a temperature higher than room temperature. Specifically, sufficient temperature is provided to facilitate extraction. Specifically, a temperature of at least any one of 30, 31, 32, 33, 34, 35, 36, 37, 38, 39, 40, 41, 42, 43, 44, 45, 46, 47, 48, 49 or 50° C., specifically up to any one of 80, 81, 82, 83, 84, 85, 86, 87, 89, 90, 91, 92, 93, 94, 95, 96, 97, 98, 99, 100, 101, 102, 103, 104 or 105 is applied.

The extract described herein may be dehumidified and optionally dried. Specifically, it may be dehumidified following water-based extraction. Specifically, dehumidification is performed by heating the extract to a temperature of at least any one of 50, 51, 52, 53, 54, 55, 56, 57, 58, 59 or 60° C., specifically up to any one of 80, 81, 82, 83, 84, 85, 86, 87, 89, 90, 91, 92, 93, 94, 95, 96, 97, 98, 99, 100, 101, 102, 103, 104 or 105, for a time sufficient to allow dehumidification. Specifically, the extract is heated for at least any one of 1, 2, 3 or 4 hours, such as to obtain a dry extract.

The extract may be dried to remove remaining water to obtain an extract comprising a certain low water content, or no detectable water. Specifically, it may be dried following dehumidification. Specifically, the extract is dried by heating the extract to a temperature of at least any one of 60, 61, 62, 63, 64, 65, 66, 67, 68, 69 or 70° C., preferably up to any one of 80, 81, 82, 83, 84, 85, 86, 87, 89, 90, 91, 92, 93, 94, 95, 96, 97, 98, 99, 100, for a time sufficient to dry the extract, preferably for at least any one of 30, 60, or 90 minutes.

The extract described herein is a micronized extract. As used herein, the term "micronized" describes a substance that is a fine powder, the particles of which are measured in microns or less in diameter. The term "micronized" typically refers to substances comprising average particle diameters reduced to the micrometer range or to the nanometer scale. The micronized dry extract provided herein comprises a maximum average particle size of 20 micrometer ($\mu$m) as described herein.

The extract described herein is preferably micronized upon drying. Micronization is the process of reducing the average diameter of a solid material's particles. Traditional techniques for micronization focus on mechanical means, such as milling and grinding. Other micronization techniques for example make use of the properties of supercritical fluids and manipulate the principles of solubility. These methods use supercritical fluids to induce a state of supersaturation, which leads to precipitation of individual particles. The most widely applied techniques of this category include the RESS process (Rapid Expansion of Supercritical Solutions), the SAS method (Supercritical Anti-Solvent) and the PGSS method (Particles from Gas Saturated Solutions).

Micronization techniques are typically based on friction to reduce particle size. Such methods include milling, bashing and grinding. Milling typically uses a cylindrical metallic drum that usually contains steel spheres. As the drum rotates the spheres inside collide with the particles of the solid, thus crushing them towards smaller diameters. In the case of grinding, the solid particles are formed when the grinding units of the device rub against each other while particles of the solid are trapped in between.

Specifically, the extract may be micronized using multiple techniques sequentially. For example, an extract may be exposed to a grinding micronization technique before using a milling micronization technique, or any other combination.

According to a specific embodiment, the extract is micronized using a spiral jet mill. Spiral jet mills are frequently used in the pharmaceuticals industry and also for the manufacture of fine-grade chemicals. Specifically, spiral jet mills are useful for size reduction below a certain threshold, such as 20 $\mu$m or less, on a laboratory scale of dry materials. Specifically, spiral jet mills are suitable for the ultrafine comminution of dry materials with a crystalline structure and a Mohs' hardness up to 3. As a result, dry compositions with an average maximum particle size in the range between 5 and 20 $\mu$m can be achieved.

To produce the extract described herein, it is specifically fractionated according to the particle size. Various methods of fractioning a sample by particle size are known in the art and may be employed. The extract may e.g. be fractionated using a precision sieving device, an air classifier or filtration techniques or any combination thereof. Specifically, the extract can be fractionated in such way that a fraction comprising particles with an average size larger than 20 $\mu$m are excluded from the extract.

According to a specific embodiment, an air classifier is used to fractionate the extract. Air classifiers work by injecting the material stream to be sorted into a chamber which contains a column of rising air. Inside the separation chamber, air drag on the objects supplies an upward force which counteracts the force of gravity and lifts the material to be sorted up into the air. Due to the dependence of air drag on object size and shape, the objects in the moving air column are sorted vertically and can be separated in this manner.

According to a further specific embodiment, the method of producing the extract described herein further comprises sterilizing the extract.

In a specific example, the extract is sterilized using the sequential steps of:
i. heating the extract to at least 95° C. for at least 5 minutes e.g., up to 125° C. for up to 30 minutes;
ii. cooling the extract to lower than −20° C. for at least 5 minutes e.g., up to 30° C. below zero for up to 30 minutes; and/or
iii. heating the extract to at least 95° C. for at least 5 minutes e.g., up to 125° C. for up to 30 minutes.

Specifically, the extract is heated to at least any one of 95, 96, 97, 98, 99, 100, 101, 102, 103, 104, 105, 106, 107, 108, 109, 110, 112, 113, 114, 115, 116, 117, 118, 119 or 120° C. or more, preferably up to 125° C., before and/or after cooling.

Specifically, the extract is heated for at least any one of 5, 6, 7, 8, 9, 10, 11, 12, 13, 14, 15, 16, 17, 18, 19, 20, 25 or 30 minutes, before and/or after cooling.

Specifically, the extract is frozen in between two heating steps e.g., by cooling it to a temperature of less than any one of 15, 16, 17, 18, 19, 20, 21, 22, 23, 24, 25, 26, 27, 28, 29, or 30° C. below zero.

Specifically, the extract is frozen for at least any one of 5, 6, 7, 8, 9, 10, 11, 12, 13, 14, 15, 16, 17, 18, 19, 20, 25 or 30 minutes.

The Mohs scale, also referred to as Mohs Hardness Scale, of mineral hardness is a qualitative ordinal scale characterizing scratch resistance of various minerals through the ability of harder material to scratch softer material. The samples of matter used by Mohs are all different minerals. Minerals are chemically pure solids found in nature. Rocks are made up of one or more minerals. As the hardest known naturally occurring substance when the scale was designed, diamonds are at the top of the scale. The hardness of a material is measured against the scale by finding the hardest material that the given material can scratch, or the softest material that can scratch the given material. For example, if some material is scratched by apatite but not by fluorite, its hardness on the Mohs scale would fall between 4 and 5. "Scratching" a material for the purposes of the Mohs scale means creating non-elastic dislocations visible to the naked eye.

The particles comprised in the extract described herein specifically comprise a hardness on the Mohs scale between 1 and 3, corresponding to an absolute hardness between 1 and 14, e.g., as determined by using a sclerometer, which microscopically measures the width of a scratch made by a diamond.

Specifically, Mohs hardness may be determined by methods well known in the art such as for example the Brinell hardness test, which characterizes the indentation hardness of materials through the scale of penetration of an indenter, loaded on a material test-piece, using the depth method or the optical method, or the Vickers hardness test. The basic principle of the Vickers hardness test, as with all common measures of hardness, is to observe a material's ability to resist plastic deformation from a standard source. Specifically, the hardness number is determined by the load over the surface area.

By BET (Brunauer, Emmett and Teller) measurement, the specific surface area of a sample is measured—including the pore size distribution. This information is used to predict the dissolution rate, as this rate is proportional to the specific surface area. Thus, the surface area can be used to predict bioavailability. The specific surface area of a powder is determined by physical adsorption of a gas on the surface of the solid and by calculating the amount of adsorbate gas corresponding to a monomolecular layer on the surface. Physical adsorption results from relatively weak forces (van der Waals forces) between the adsorbate gas molecules and the adsorbent surface area of the test powder. The determination is usually carried out at the temperature of liquid nitrogen. The amount of gas adsorbed can be measured by a volumetric or continuous flow procedure. The data are then used to determine the BET surface area according to the BET adsorption isotherm equation.

The extract described herein is particularly characterized by a high specific BET surface area e.g., at least 0.5 $m^2/g$ (dry weight) or at least 0.75 $m^2/g$ (dry weight), preferably at least 1.0 $m^2/g$ (dry weight).

Further provided herein is a cosmetic, or pharmaceutical product, or a dietary supplement comprising the dry extract in a suitable formulation, as described herein.

According to a specific embodiment, a formulation comprising the extract described herein, is used for cosmetic, or pharmaceutic (including therapeutic or non-therapeutic) dermatologic treatment.

As used herein, the term "dermatologic treatment" specifically refers to treatment of skin, hair, nails or oral mucosa of a subject. Specifically, the treatment improves the complexion of human skin, preferably human facial skin. Specifically, the term "skin treatment" encompasses treatment to reduce inflammatory effects, reduce acne lesions, moisturize skin, purify skin, or to achieve anti-stinging, soothing, improved wound healing, skin barrier and sebo-regulating, or to reduce skin damage caused by air-pollution, and/or anti-aging of skin, such as reducing crow's feet, or reducing or preventing fine lines.

According to a specific embodiment, the formulation or product used for dermatologic treatment as described herein is an anti-acne product, anti-aging product, anti-stinging product and/or soothing product.

Specifically, the anti-stinging and/or soothing product provided herein comprises 0.05% to 25.0% (w/w) of the dry extract described herein. Even more specifically, the anti-stinging and/or soothing product comprises 0.5 to 10% (w/w), preferably 1.0 to 5.0% (w/w) and even more preferably 1.5 to 2.5% (w/w) of the extract described herein. Specifically, the anti-stinging product described herein significantly decreases stinging intensity within 5 to 10 minutes. Specifically, the stinging intensity is decreased by about any one of 50, 60, 70, 80 or 90%. Specifically, the stinging intensity is decreased by up to 100% after about any one of 10, 15, or 20 minutes. A decrease in stinging intensity is e.g. determined by the stinging-test of Frosch and Kligman (1977) (*J Soc Cosmet Chem* (1977); 28: 197-209), wherein an acidic solution is applied to the nasolabial fold.

Specifically, the anti-stinging and/or soothing product provided herein decreases cutaneous sensitivity after continued use for at least 28 days, during which time period the product is applied at least once or twice a day. Specifically, the cutaneous sensitivity is decreased for at least any one of 50, 60, 70 or 80%. The cutaneous sensitivity is e.g. determined by the stinging-test of Frosch and Kligman (1977), wherein an acidic solution is applied to the nasolabial fold.

Specifically, the anti-acne product described herein comprises 0.05% to 25.0% (w/w) of the dry extract described herein. Even more specifically, the anti-acne product comprises 0.5 to 10% (w/w), preferably 1.0 to 5.0% (w/w) and even more preferably 1.5 to 2.5% (w/w) of the extract described herein.

Specifically, the anti-acne product described herein reduces acne lesions. Specifically, the anti-acne product described herein reduces skin inflammation, specifically inflammatory acne lesions.

Specifically, the anti-acne product provided herein reduces acne lesions and/or skin inflammation, by at least any one of 50, 60, 70 or 80%. Specifically, the anti-acne product decreases inflammatory acne, specifically, it decreases inflammatory acne by at least any one of 50, 60, 70 or 80%. Specifically, the reduction in acne lesions or inflammation may be determined by assessing the anti-acne effect/comedogenic potential after a sufficient application time of the product to be tested, e.g. about 14, 28 or 30, in comparison with the number of lesions on the face before application (D0). Specifically, on D0 and DX (the day of assessment, e.g. D14, D28 or D30), the dermatologist counts acne lesions, such as e.g. blackheads, microcysts (retentional lesions), papules and/or pustules (inflammatory lesions) on the face, preferably the whole face but omitting the nasal pyramid. The variations (DX-D0) in the number of lesions are calculated for each kind of lesion.

Specifically, the anti-acne product provided herein improves skin texture, pores and/or porphyrin state. Specifically, it improves skin texture, pores and/or porphyrin state by at least any one of 20, 30, 40, or 50% or more. Specifically, an improvement in skin texture, pores and/or porphyrin state may be determined using imaging systems such as the VISIA® imaging system from CANFIELD®. Preferably, the imaging system allows taking pictures with multiple lighting modes at a rapid rate and control of the repositioning directly on data-processing screen using an overlay visualization of the images at each time of acquisition. Specifically, photographs are taken on D0 before application of the product to be tested and after a certain application time of the product, e.g. any one or more of about 7, 14, 28, or 30 days. Specifically, one photograph of the full face at front is taken under multi-spectral imaging and analysis (normal light, cross-polarized and UV light), then the analysis of texture, pores and porphyrin state is performed. Specifically, visualization of the texture and pores state is presented with normal light and porphyrin state is presented with UV light.

Specifically, the anti-acne product described herein is very well tolerated on skin, helps to cleanse skin and/or strengthens skin.

Specifically, the anti-aging product described herein comprises 0.05% to 25.0% (w/w) of the dry extract described herein. Even more specifically, the anti-aging product comprises 0.5 to 10% (w/w), preferably 1.0 to 5.0% (w/w) and even more preferably 1.5 to 2.5% (w/w) of the extract described herein.

Specifically, the anti-aging product provided herein increases skin firmness, such as determined by e.g. a cutometer. Specifically, it increases skin firmness by at least 4%, specifically about 5%, after 28 days of use.

Specifically, the anti-aging product provided herein increases viscoelasticity of the skin, such as determined by e.g. a cutometer. Specifically, it increases viscoelasticity by at least 10%, specifically about 11%, after 28 days of use.

Specifically, the anti-aging product provided herein decreases viscous deformation of the skin, such as determined by e.g. a cutometer. Specifically, it decreases viscous deformation of the skin for at least 10%, specifically about 11 or 12%, after about 28 days of use.

Specifically, the anti-aging product provided herein increases the skin moisture level, such as determined by e.g. a corneometer. Specifically, it increases the skin moisture level by at least 10%, preferably about 11%, after about 5 minutes. Even more specifically, it increases the skin's moisture level by about 6% after 28 days of use.

Specifically, the anti-aging product provided herein increases the radiance under eye area, such as determined by e.g. clinical grading, wherein the radiance is determined using visual scoring of the cutaneous state and aspect using a structured scale from 0 (dull/grey eye contour) to 10 (bright/radiant eye contour). Specifically, it increases the radiance under eye area by at least 15%, preferably about 16 or 17%, after 28 days of twice-daily application on the skin under the eye.

Specifically, the anti-aging product provided herein smoothens crow's feet around the eyes, such as determined by e.g. high-resolution 3D imaging using for example a fringe projection system. Specifically, the anti-aging product provided herein smoothens or prevents fine lines on the skin, specifically on the skin of the face, such as determined by e.g. high-resolution 3D imaging using for example a fringe projection system. Specifically, the anti-aging product described herein is applied to the skin at least once a day, preferably at least twice a day. Specifically, it is applied to the skin of the face.

Specifically, the formulation provided herein for topical use to be applied onto the skin or hair e.g., the cosmetic product described herein, provides a moisturizing effect on skin and hair, respectively. Specifically, the cosmetic product described herein is not fatty or greasy upon application. Specifically, the cosmetic product described herein is suitable for sensitive skin. Specifically, the cosmetic product described herein increases resistance against environmental impact.

Specifically, the cosmetic product described herein is a hair care product. Specifically, the hair care product is used for improving the complexion of hair of human beings. Specifically, the term "hair treatment" encompasses treatment to improve the elasticity of hair fibers, improve the flexibility of hair fibers, improve hair volume, reduce flakiness on top of the hair, improve shines and/or repair hair fibers, improve scalp conditions and/or reduce dandruff. Specifically, the cosmetic product described herein significantly reduces tensile strength and Young's modulus of the hair, specifically of both white and blonde hair.

Specifically, dermatologic treatment also refers to oral mucosal treatment. Specifically, the term "oral mucosal treatment" encompasses treatments to improve gum condition, reduce periimplantitis and periodontitis bacteria, reduces odor-causing bacteria, reduce caries pathogen, reduce plaque, and/or improves teeth whitening.

According to specific examples, the cosmetic product is in the form of a skin cream, shampoo, hair conditioner, tooth paste, deodorant, soap, skin gel, lip balm, facial mask, makeup or ointment. According to further specific examples, the cosmetic product is used in the form of a facial cleansing foam, make-up remover, facial cleansing mask, facial purifying masks, day cream for oily skin, deodorant stick, blemish balm cream (BB cream), colour correction cream (CC cream), or anti-cellulite gel.

As used herein the term "dietary supplement" refers to an oral composition to supplement the diet in a physical form for ingestion, such as a pill, capsule, tablet, powder or liquid form that is not a drug. In certain embodiments, this disclosure relates to dietary supplements comprising the formulation or composition disclosed herein optionally in combination with other ingredients of a dietary supplement such as a vitamins, minerals, herbs, concentrates, or metabolites.

According to a specific example, the dietary supplement is in the form of a lozenge, a chewing gum, a powder, a sublingual spray, a solid or semi-solid candy, a tablet, an orally disintegrating tablet, a troche, or an oral film strip. Specifically, the dietary supplement described herein is used for non-therapeutic, non-medical, nutrition of a subject, preferably a human subject.

The dietary supplement described herein has a high absorption rate and significantly improves the gut barrier, specifically the human gut barrier.

The dietary supplement provided herein may also be used to improve the complexion of the skin. Improvement of the complexion of the skin using a topical or an oral formulation may e.g. be determined by the methods described herein.

Specifically, improvement of the skin of a subject suffering from dermatitis, specifically atopic dermatitis may e.g. be determined using the SCORing Atopic Dermatitis (SCORAD) test. SCORAD enables objective assessment of extent and intensity of atopic dermatitis together with a subjective assessment of suffering intensity (itching impulse and sleeplessness). Specifically, any one or more or all of the following parameters is evaluated for affected body areas by a grading scale (0-3): erythema, oedema/development of papule, exudating/incrusting, excoriation, lichenification, dryness of skin. SCORAD is calculated by sum of parameter of corresponding body areas and pruritus and sleeplessness, and values are compared before and after treatment, typically, testing is done after at least 7, 14, 28 or 35 days of treatment.

Specifically, improvement of the skin of a subject suffering from psoriasis may be determined using PASI-Scores (Psoriasis Area and Severity Index). Specifically, any one or more or all of the following parameters is evaluated for affected body areas: redness, raised skin, shedding (flaking). The PASI score is calculated by sum of the evaluated parameters of all corresponding body areas and values are compared before and after treatment. Typically, testing is done after at least 7, 14, 28 or 35 days of treatment.

The dietary supplement provided herein may be used to improve digestion. Specifically, the dietary supplement described herein can be used to promote digestive health, metabolism (nutritional heath), and weight management when administered orally, e.g. by improving colon barrier function and/or reducing inflammation. For example, the oral formulation or composition can be used to treat or alleviate a sign or symptom of a digestive disorder, such as constipation, bloating, diarrhea, heartburn, nausea, vomiting, and pain in the bowel area. According to a further example, the formulation or composition described herein may be used to treat an inflammatory disease or disorder of the digestive system or to alleviate symptoms of such diseases or disorders, such as e.g. irritable bowel syndrome, Crohn's disease, or ulcerative colitis, when administered orally. The formulation or composition described herein may further be used to alleviate symptoms of food allergies or intolerances such as e.g. lactose intolerance, fructose intolerance, histamine intolerance, or celiac disease or others.

Further provided herein is an extract and respective formulation for use as a medicament. Specifically, provided herein is a pharmaceutical preparation comprising the extract described herein. Specifically, the extract provided herein is suitable for use in the treatment of one or more dermatologic diseases or disorders.

As used herein, the term "treatment" is meant to include both prophylactic and therapeutic treatment.

The term "dermatologic disease or disorder" as used herein, includes all diseases or disorders in which skin is diseased or has a disorder, or in which skin is involved in an at least mediatory role. Specifically, the term refers to an abnormal skin condition caused by inflammatory, allergic or autoimmune reactions. Typical symptoms of skin related diseases or disorders referred to herein include, for example, raised bumps that are red or white, a rash (which might be painful or itchy), scaly or rough skin, peeling skin, open sores or lesions, and dry, cracked skin. Specifically, the formulation provided herein may be used for thickening the epidermis and/or for increasing the number of living skin layers, and/or for improving the skin barrier, and/or for improving the organization of the stratum corneum, and/or for decreasing the skin tissue's irritant potential, and/or as anti-oxidative agent(s), and/or for treating or preventing one or more skin diseases in aging.

Inflammatory diseases of the skin include, for example, dermatitis, specifically atopic dermatitis, psoriasis, bacterial and viral skin inflammation, and acne. Dermatitis is an inflammation of the skin.

Specifically, the extract or medicament described herein is used to treat or prevent acne, psoriasis, atopic dermatitis, skin inflammation, rosacea and skin redness.

Specifically, the medicament comprising the extract described herein may be provided in the form of a cream, emulsion, gel, ointment, lotion, spray, solution, dry powder or a tablet.

Specifically, the medicament, cosmetic product or dietary supplement preparation can be produced by conventional processes known to the person skilled in the art. For example, it is produced by incorporation of the extract described herein in a pharmaceutically or cosmetically acceptable formulation comprising pharmaceutically acceptable carriers. Specifically, the cosmetic product provided herein can comprise cosmetic auxiliary substances and additives such as are conventionally used in such formulations.

Exemplary auxiliary substances and additives are pharmaceutically acceptable carriers described herein, including e.g. the solvents, solubilizing agents, emulsifiers and viscosity controlling agents described herein.

Specifically, the formulation provided herein is formulated in such a way that it can be applied topically to a subject's skin or mucosal tissue, or that it can be administered orally to a subject.

As used herein, "pharmaceutically acceptable" means that the ingredients which the term describes are suitable for use in contact with tissues (e.g., the skin or mucosal tissue) without undue toxicity, incompatibility, instability, irritation, allergic response, and the like.

Pharmaceutically acceptable carriers generally include any and all suitable solvents, dispersion media, coatings, antibacterial and antifungal agents, isotonic and absorption delaying agents, and the like that are physiologically compatible the composition provided herein. As described herein, the formulation provided herein is applied topically to a subject's skin. Pharmaceutical carriers suitable for facilitating such means of administration are well-known in the art.

Pharmaceutically acceptable carriers generally include any and all suitable solvents, such as for example sterile water, saline, phosphate buffered saline, dextrose, glycerol, and the like, as well as combinations of any thereof. Further pharmaceutically acceptable carriers generally include any and all suitable dispersion media, coatings, isotonic and absorption delaying agents, and the like that are physiologically compatible with the formulation provided by the invention.

In one embodiment, suitable pharmaceutically acceptable carriers include, but are not limited to, inert solid fillers or diluents and sterile aqueous or organic solutions (e.g., polyethylene glycol, propylene glycol, polyvinyl pyrrolidone, etc.). In certain such embodiments, suitable pharmaceutically acceptable excipients include, but are not limited to, water, salt solutions, alcohol, polyethylene glycols, gelatin, lactose, amylase, magnesium stearate, talc, silicic acid, viscous paraffin, hydroxymethylcellulose, polyvinylpyrrolidone, fillers, such as sugars (e.g., lactose, sucrose, mannitol, or sorbitol), and cellulose preparations (e.g., maize starch, wheat starch, rice starch, potato starch, gelatin, gum tragacanth, methyl cellulose, hydroxypropylmethylcellulose, sodium carboxymethylcellulose, and/or polyvinylpyrrolidone PVP).

Additional pharmaceutically acceptable carriers are known in the art and described in, e.g., REMINGTON'S PHARMACEUTICAL SCIENCES.

According to a specific embodiment, pharmaceutically acceptable carriers and other additives can generally be included in the formulation described herein in quantities of 1 to 95% (w/w), preferably 5 to 70% (w/w), more preferably 5 to 50% (w/w), in each case based on the total weight of formulation. The amounts of cosmetic or dermatological auxiliary agents and additives and perfume to be used in each case can easily be determined by the person skilled in the art by simple trials, depending on the nature of the particular product. According to a further specific embodiment, the formulation described herein preferably contains water in a quantity of up to 98% (w/w), preferably 10 to 95% (w/w), more preferably 40 to 90% (w/w), in each case based on the total weight of the formulation.

A preparation described herein is specifically administered at an effective amount, in particular a therapeutically effective amount, meaning a quantity or activity sufficient to effect beneficial or desired results, including clinical results, when administered to a subject, e.g. a patient suffering from a disease or disorder of the skin, hair, digestive system or mucosal tissue. As such, an effective amount or synonymous quantity thereof depends upon the context in which it is being applied. An effective amount is intended to mean that amount of a compound that is sufficient to treat, prevent or inhibit such diseases or disorders.

Specifically, the preparation described herein may be administered once or twice a day. Specifically, the preparation described herein is administered at least any one of 1, 2, 3, 4, or 5 times a day, or more.

The amount of the preparation described herein, or the extract contained in the preparation described herein, that will correspond to such an effective amount will vary depending on various factors, such as the given drug or active substances (in particular humic substances), the pharmaceutical formulation, the route of administration, the type of disease or disorder, the identity of the subject or host being treated, and the like, but can nevertheless be routinely determined by one skilled in the art.

The formulation provided herein may be one of many topical formulation types, preferably containing water as the major ingredient, including creams, emulsions, gels, ointments, lotions, sprays, solutions, pastes or tinctures. It is preferred, although not required, that the formulation is in the form of an aqueous suspension. Accordingly, the formulation described herein may contain an agent to stabilize the suspension such as an emulsifier or a viscosity controlling agent. Any emulsifier or viscosity controlling agent that is water-dispersible, suitable for use on epithelial tissue such as skin, and forms an aqueous gel of substantially uniform consistency, is suitable for use in the formulation described herein.

The term "emulsifier" as used herein refers to a suitable pharmaceutically acceptable surfactant. Examples of emulsifiers include naturally occurring phospholipids extracted from egg yolk or soybean (e.g., L-oc- lecithin, soybean (or other sources)), synthetic phosphatidyl cholines or purified phosphatidyl cholines from vegetable origin. Preferred emulsifiers include carboxyvinyl polymers, also known as carbomers, such as are sold under the tradename CARBOPOL® (B. F. Goodrich Co., Akron, Ohio, USA), ETD 2020™, and ULTREZ® (Noveon, Inc., Cleveland, Ohio, USA).

The term "viscosity controlling agent" as used herein refers to any agent that is capable of controlling the thickness of the topical formulation described herein. Typically, viscosity controlling agents are capable of decreasing the sedimentation velocity of the dispersed ingredients by maintaining the viscosity of the suspension at a constant level, and so minimize or delay the formation of precipitates to distribute the active ingredients homogeneously in the whole suspension. Exemplary viscosity controlling agents are xanthan gum, betaine, pentylene glycol, hypromellose, or hydroxypropyl celluloses, such as hydroxypropyl-methyl cellulose.

The formulation described herein may further comprise a solvent, specifically any one or more solvents selected from the group consisting of methylene chloride; beta-cyclodextrin; dichloromethane; oily excipients or solvents are vegetable or animal oils, such as sunflower oil or cod liver oil; for aqueous or alcoholic solutions are water, ethanol, sugar solutions, or mixtures thereof; physiological saline solution such as glycerol; alcohols such as methanol, ethanol, propanol, isopropyl alcohol; sugar solutions such as glucose or mannitol solutions, or mixtures thereof; aromatic hydrocarbon solvents such as benzene, chlorobenzene, toluene and xylene; ether solvents such as diethyl ether, tert-butylmethyl ether, dimethoxyethane, tetrahydrofuran, dioxane and THF; aliphatic hydrocarbon solvents; ester solvents such as ethyl acetate; ketone solvents; chlorinated hydrocarbon solvents such as dichloromethane, chloroform and 1,2-dichloroethane; an organic solvent such as acetonitrile, 1,3-dimethyl-2-imidazolidinone, dimethylformamide, N-dimethylacetamide, N-methylpyrrolidine, dimethylsulfoxide, pyridine, nitromethane, and mixtures thereof.

The formulation described herein may further comprise a solubilizing agent, specifically any one or more solubilizing agents selected from the group consisting of citric acid, ethylenediamine-tetraacetate, sodium meta phosphate, succinic acid, urea, cyclodextrin, polyvinylpyrrolidone, diethylammonium-ortho benzoate, and micelle-forming solubilizers such as TWEEN® and spans, such as TWEEN 80®;

polyoxyethylene sorbitan fatty acid ester, polyoxyethylene n-alkyl ethers, n-alkyl amine n-oxides, polyoxamers, organic solvents, such as acetone, phospholipids, cyclodextrin, triacetin, triethylcitrate, ethyl oleate, ethyl caprylate, sodium lauryl sulfate, sodium doccusate, vitamin E TPGS, dimethylacetamide, N-methylpyrrolidone, N-hydroxyethylpyrrolidone, polyvinylpyrrolidone, hydroxypropylmethyl cellulose, hydroxypropyl cyclodextrins, ethanol, n-butanol, isopropyl alcohol, cholesterol, bile salts, polyethylene glycol 200 to 600, glycofurol, transcutol, propylene glycol, and dimethyl isosorbide, miglyol, glycerin and glycerol.

The formulation described herein may further comprise aromas and/or perfumes. The one or more aromas and/or perfumes may for example be selected from the group consisting of Natural fragrances such as buttery, banana, almond, bitter almond, cherry, cinnamon, fruity, grape, orange, pear, pineapple, sugar, cotton candy, vanilla, wintergreen, minty, apple, rosemary, lavender, *ginseng*, musk, green tea, violet, lily, lemon, rose, jasmine, blueberry, peach, coconut, orange, mandarin, jam, apricot, fennel, honey, plum, raspberry, and artificial fragrances such as benzaldehyde, p-tolyl aldehyde, decyl aldehyde, cinnamic aldehyde, ionone, gamma undecalactone, anethole, malonates, phenylacetate acid ester, ethyl acid ester, cyclohexyl cinnamate, ethyl acetosuccinate, citronella, geraniol, and linalool.

The formulation described herein may further comprise oils, and/or fats, such as for example argan oil, specifically argania *spinosa* kernel oil, sweet almond oil, castor seed oil, sunflower seed oil, cocoa seed butter, mango seed butter, or sheabutter.

The examples described herein are illustrative of the present invention and are not intended to be limitations thereon. Many modifications and variations may be made to the techniques described and illustrated herein without departing from the spirit and scope of the invention. Accordingly, it should be understood that the examples are illustrative only and are not limiting upon the scope of the invention.

Examples

Example 1: Manufacturing Process of Alpine Heilmoor Extract (AHE)

AHE is not clay, since the composition of clay is mainly inorganic and the AHE extract has an organic composition (multicomponent mixture). The manufacturing process of AHE mainly focuses on isolating all the organic compounds to generate a highly concentrated organic extract.

Figure 1B:
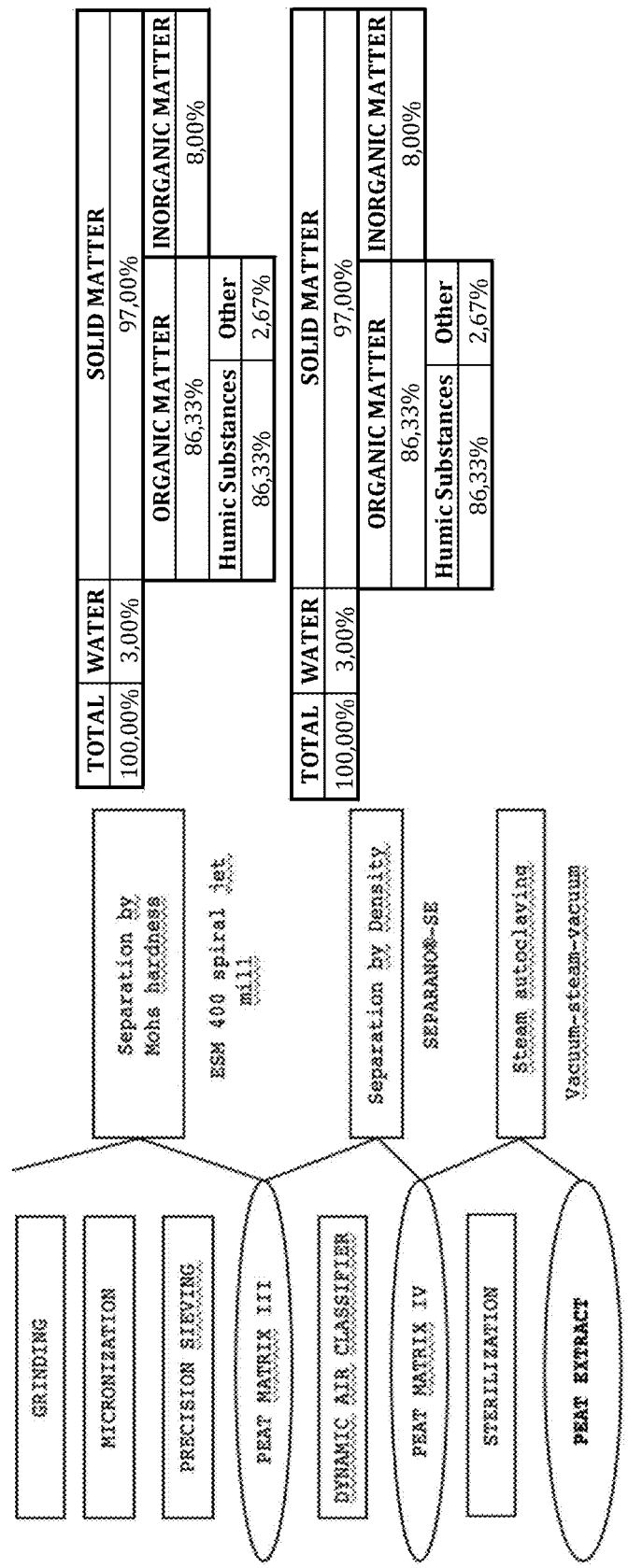

For an overview on the extraction process and Heilmoor Matrix compositions at each step see FIG. 1A and FIG. 1B.

The Alpine Heilmoor Extract was produced according to the following process.

Heilmoor Matrix I
Layer based Extraction by Organic Composition: The Heilmoor has based on the history of development a special composition. The various layers have been analyzed and the most potent organic composition has been identified based on Organic group analysis. These potent compositions are found between 2.4m and 3.7m (see FIG. 2) and have the following composition 85.96% water, and 14.04% solid matter. Of the solid matter, 11.69% are organic matter and 2.35% are inorganic matter. Extraction site was St. Georgen am Längsee, Austria.

Organic group analysis has shown that the organic matter has the following characteristics: Humic Acid: 60.85%, Fulvic Acid: 21.00%, Ulmic Acid: 8.52%, Cellulose, Hemicellulose 4.51%, Cellulose, Humus components: 2.66%, Pectins, Proteins: 1.30% and Bitumen content: 0.95%.

Heilmoor Matrix II
Water based Extraction by Organic Composition:
Reaction Isolation of water-soluble components
Time: 4 hours
Pressure: 3bar
Technology: AIRGENIX
Temperature: 40° C.
Composition: 40% Water, 60% solid matter
Dehumidification:
Reaction Dehumidification of remaining water components
Time: 3 hours
Pressure: 1 bar
Temperature: 55° C.
Composition: 10% Water, 90% solid matter
Drying:
Reaction: Drying
Time: 1 hours
Pressure: 1 bar
Temperature: 65° C.
Composition HEILMOOR MATRIX II: 3-5% Water, 95% solid matter Heilmoor Matrix III
Reaction: Grinding, Micronization and Precision Sieving
Time: 1 hour total
Pressure: 8 bar
Temperature: 40° C.
Technology: Separation by Mohs Hardness using ESM 400 Spiral Jet Mill
Fractioning: 45 µm
Composition HEILMOOR MATRIX III: 95% organic matter and 5% inorganic matter Heilmoor Matrix IV
Reaction: DYNAMIC AIR CLASSIFIER
Time: 1 hours
Pressure: 8 bar
Temperature: 20° C.
Technology: Separation by Density using SEPARANOSE
Fractioning: and 520 µm
Composition HEILMOOR MATRIX IV: 98-99% organic matter and 1-2% inorganic matter Alpine Heilmoor Extract (Ahe)
The composition Heilmoor Matrix IV was then sterilized to produce the Alpine Heilmoor Extract.
Phase 1:
Reaction: Sterilization
Time: 10 minutes
Temperature: 112° C.
Technology: Steam autoclaving
Phase 2:
Reaction: Deep-Freeze
Time: 10 minutes
Temperature: −25° C.
Technology: Freezing
Phase 3:
Reaction: Sterilization
Time: 10 minutes
Temperature: 112° C.
Technology: Steam autoclaving Example 2: Quality Control (Particle Size, BET Surface Area and Organic Parameters)

For the determination of particle size and BET surface area two samples of the AHE were prepared according to Example 1. In a first sample, the extract was micronized for 10 minutes using a spiral jet mill (Sample A). In a second sample, the extract was micronized for 35 minutes using a spiral jet mill (Sample B).

1. Determination of Particle Size
1.1 Measuring Principle and Instrument Technology
With the BETTERSIZER S3 Plus, three basic experiments can be carried out to determine the particle size distribution of a powder or dispersion:
  1. static light scattering
  2. static light scattering combined with dynamic image analysis
  3. dynamic image analysis

1.1.1. Static Light Scattering with the Innovative Double Lens Technology (DLOIS)

Short wave light from a laser source (wavelength 532 nm) hits the particles to be characterized in dispersion and is elastically scattered at them. With the S3 PLUS, this scattering is measured in a very large angular range (up to 165°) in forward, sideways and backward scattering with the help of permanently installed detectors. This is made possible by a special Fourier design with double lens technology (DLOIS=Dual Lenses & Oblique System).

The laser is arranged at an angle to the measuring cuvette in order to enable the widest possible scattering angle range of the lateral front detectors. Lens 2 generates a parallel laser beam which hits the sample. Lens 1 focuses the scattered light into the detector plane according to the Fourier construction and the scattering particles in the cuvette do not necessarily have to lie in one plane. Lens 2, for its part, ensures focusing and thus detection of the backscattered radiation also over a very large angular range.

The particles are dispersed wet in almost any solvent (water, alcohols, non-polar solvents such as oils, heptane, etc.). With the external dispersion unit, the dispersion medium with the particles to be measured is continuously pumped through the measuring cuvette. In accordance with the DIN-ISO-13320-1 standard, the software can evaluate the raw data using two theories that can be applied depending on the measuring range: the Fraunhofer theory, which explains the development of the characteristic intensity distribution on the basis of the Huygen principle and geometric optics using light diffraction (far-field nutrition).

Secondly, the Mie theory can be used to evaluate the scattering of the electromagnetic light wave at the particles, preferably for violets with a diameter smaller than the light wavelength. In this case, the complex refractive index of the sample is required for correct evaluation.

The unique DLOIS-T technology enables very stable and reproducible particle size measurements with one laser and without extremely long optical path lengths over a measuring range of 0.01-3500 µm.

1.1.2. Static Light Scattering Combined with Dynamic Image Analysis

In large size distributions in particular, accurate detection of coarse particles with static light scattering is difficult: Firstly, they are clearly in the minority in terms of numbers, making it difficult to detect them correctly statistically.

Secondly, coarse particles scatter only in the forward direction—an exact angular resolution for the exact differentiation of the occurring quantities is difficult!

For this reason, the combination of static light scattering (fine particles) with dynamic image analysis (coarse particles) is a good way to take advantage of both techniques.

With the BETTERSIZER S3 (Plus) the coarse particles are photographed and statistically evaluated with an integrated high-speed CCD camera (×0.5). In addition, the live CCD camera image can be switched on online so that the user can assess size and type (spheres, agglomerates, air bubbles).

In summary, the combined use of DLOIS technology and dynamic image analysis allows a precise measurement of widely distributed systems from 0.01-3500 µm as well as a visual assessment of the analysis performed.

1.1.3 Dynamic Image Analysis with Two High-Resolution CCD Cameras

As a third experiment, the BETTERSIZER S3 Plus offers particle size and shape analysis with two high-speed CCD cameras (10000 particles/minute, ×0.5 for coarse particles>approx. 100 µm and ×10 for small particles>approx. 5 µm). Each individual particle is captured, stored as an image, numbered and statistically evaluated. In addition to the (CE equivalent diameter), the aspect ratio (aspect ratio, length L/width D), circularity and circumference are calculated.

The BETTERSIZER S3 Plus thus offers the option of using essential shape parameters for additional characterization or classification of particles in addition to the best possible particle size analysis. Especially for strongly formanisotropic particles such as fibers or platelets, this is a clear advantage compared to the classical "pure" laser diffraction, which results from the evaluation of spherical particles. In addition, the degree of agglomeration of the systems can be assessed and special tasks such as oversized particle analysis can be realized.

1.2 Results

1.2.1 Particle Size Measurement Using Static Light Scattering (Laser Diffraction)

The samples were measured with the BETTERSIZER S3 PLUS regarding particle size distribution (static light scattering according to DIN-ISO-13320-1) in deionised water and isopropanol.

For sample A an average particle size of 6.74 µm was determined and for sample B an average particle size of 5.45 µm was determined. The average particle size is herein provided as the median, i.e. the 50th percentile.

TABLE 1

Average particle size of sample A: 6.74 µm

| Percentile | size [µm] |
|---|---|
| 10 | 1.326 |
| 30 | 3.85 |
| 50 | 6.74 |
| 60 | 8.62 |
| 70 | 11.26 |
| 80 | 15.03 |
| 90 | 21.01 |
| 95 | 28.11 |
| 98 | 43.28 |
| 99 | 57.74 |

TABLE 2

Average particle size of sample B: 5.45 µm

| Percentile | size [µm] |
|---|---|
| 10 | 1.134 |
| 30 | 3.09 |
| 50 | 5.45 |
| 60 | 6.53 |
| 70 | 7.75 |
| 80 | 9.45 |
| 90 | 12.75 |
| 95 | 16.52 |
| 98 | 21.78 |
| 99 | 25.88 |

2. BET Surface Area

Gas adsorption for the determination of the specific surface according to BET

2.1 Materials & Methods

In gas adsorption according to DIN-ISO 9277 (or DIN 66131), the specific surface of solids is determined by the BET method using nitrogen adsorption at 77.4K as standard. Sample preparation is carried out at the indicated temperatures, the sample surface must not change. With the static-volumetric method, a certain quantity of gas is dosed onto the tempered sample, which is in a vacuum. The determination of the adsorbed quantities is based on a gas equation and pressure measurements in volume-calibrated systems. With the dynamic method, the adsorbed quantity is determined by means of a thermal conductivity detector, which detects the change in the gas composition of an $N_2$/He mixture.

From the measured values (adsorbed volume $V_a$ vs. relative pressure $p/p_0$), the number of molecules in a monolayer on the solid surface is calculated on the basis of the linearized BET equation:

$$\frac{p/p_0}{V_a(1-p/p_0)} = \frac{1}{V_m C} + \frac{C-1\,p}{V_m C p_0}$$

The calculated monolayer capacity $V_m$ [mol] leads with the Avogadro number $N_A$ and the space requirement of an adsorbate molecule am to the specific surface $O_{SP}$:

$$O_{SP} = V_m \cdot N_A \cdot a_m$$

The evaluation takes place in the general validity area of the BET method from $p/p_0$=0.05-0.3 or the specified relative pressure range. For very small surfaces krypton adsorption is used at 77.4K.

2.2 Results

The samples (sample A and sample B) were prepared under vacuum for 25 h at 80° C. and then measured with nitrogen at 77 K on a QUANTACHROME QUADRASORBevo.

Sample A had a BET-surface area [m²/g] of 0.54 and sample B had a BET-surface area [m²/g] of 1.02.

3. Organic Parameters

Organic Parameters—Alpin Heilmoor Extract (in Total 85%-99%)

Components Hydrolysable with Diluted HCl:

The residue of the water extract dried at 110° C. is weighed into a round flask and heated with 300 mL 2% HCl for 3 hours under backflow. The extraction solution contains hemicelluloses and small amounts of cellulose. The residue is filtered off, washed, dried and weighed by means of glass filter crucibles. The extraction solution is dried, weighed and annealed to determine the inorganic content of the extraction solution.

Components Hydrolysable with Strong Sulphuric Acid:

The residue of the HCl extraction dried at 110° C. is weighed into a round flask and left with approx. 20 mL 72% $H_2SO_4$, stirring occasionally. Dilute with 300 mL $H_2O$ and heat for 5 hours under reflux. The remaining residue is filtered off, washed, dried and weighed using a glass filter crucible. Part of the residue is annealed at 980° C. (ash content). The extraction solution contains celluloses as well as smaller amounts and lignin and humic acids. The residue contains lignin and humic substances.

Components Insoluble in Alkali and Acetyl Bromide:

Weigh about 8 g of the dry AHE to the nearest 0.1 mg and heat it with 300 mL 2% HCl for 3 hours under reflux. The residue is extracted several times with 0.5% NaOH at 20° C. The combined extracts are acidified with diluted HCl to precipitate the humic substance/humic acid fraction (=humic acid, fulvic acid and ulmic acid). The residue (=humic substance/humic acid fraction) is filtered off, washed, dried and weighed. After treatment with approx. 20 mL acetyl bromide, the humic substance/humic acid fraction remains in the residue.

Example 3: Anti-Acne Effect of Formulation Comprising AHE

The Alpine Heilmoor Extract (AHE) was formulated in a skin cream and its anti-acne effect was tested.

Skin cream composition:

TABLE 3

Formulation comprising AHE

| Ingredient | % concentration [w/w] |
|---|---|
| Peat Extract | 1.5 |
| Sorbitan Stearate + Sorbityl Laurate | 3 |
| Myristyl Lactate | 5 |
| Glycerin + Aqua + Hamamelis Virginiana Leaf Extract | 5 |
| Pentylene Glycol | 5 |
| *Theobroma Cacao* (cocoa) Seed Butter | 2 |
| *Prunus Amygdalus Dulcis* (sweet Almond) Oil | 2 |
| *Butyrospermum Parkii* Butter | 2 |
| Myristyl Myristate | 5 |
| Pectin + Xanthan Gum + Carrageenan | 0.75 |
| Aqua | 68.75 |

Principle

The anti-acne effect/comedogenic potential is assessed after 28 days of use, in comparison with the number of lesions on the face before application (D0).

On D0 and D28, the dermatologist counts blackheads and microcysts (retentional lesions) as well as papules and pustules (inflammatory lesions) on the face (except nasal pyramid). The variations (D28-D0) in the number of lesions are calculated for each kind of lesions. Descriptive statistics are done in order to determine the variation significance.

Results

After 28 days of twice daily use, the present formulation induced a significant decrease in the number of microcyts and papules and a limit significant decrease in the number of pustules. Moreover, a significant decrease in the number of global non-inflammatory, inflammatory and thus total lesions was observed. The number of blackheads was unchanged. The results are summarized in FIG. 3.

No comedogenic and acnegenic reaction was observed during the study.

Under these study conditions, after 28 days of twice daily use, the formulation presented an anti-acne effect.

Effect on Skin Texture, Pores and Porphyrin State Using Visia®

The device used is the VISIA® from CANFIELD® imaging systems. The VISIA allows taking pictures with multiple lighting modes and a very rapid capture of images. The control of the repositioning takes place directly on data-processing screen using an overlay visualization of the images at each time of acquisition.

On D0, D7 and D28, one photograph of the full face at front is taken under multi-spectral imaging and analysis (normal light, cross-polarized and UV light) allows capturing visual information, then the analysis of texture, pores and porphyrin state is performed. Visualization of the texture and pores state is presented with normal light and porphyrin state is presented with UV light.

After 28 days of twice daily use, the formulation induced a decrease in the number of porphyrin, which characterizes a reduction of susceptibility to acne lesions. Results are summarized in Table 4.

TABLE 4

Reduction in porphyrin

A decrease in the number of porphyrin indicates
a reduction of susceptibility to acne lesions

| Kinetics | Variations (mean ± SEM) | Δ % on the mean | % of subjects with the expected effect |
| --- | --- | --- | --- |
| ΔD7 | −200.7 ± 167.8 | −9% | 63% |
| ΔD28 | −166.7 ± 150.9 | −8% | 53% |

Conclusion

Under these study conditions, after 28 days of twice daily use, the formulation:

was very well tolerated on the cutaneous level, presented an anti-acne effect, induced a decrease in the number of porphyrin, which characterizes a reduction of susceptibility to acne lesions, and was appreciated by a majority of the subjects for their properties and for their efficacy: 73% of subjects stated that the product prevents inflammatory acne if used regularly, and 82% of subjects stated that the product reduces inflammatory acne.

Example 4: Anti-Stinging and Anti-Redness Effect of Formulation Comprising AHE The Alpine Heilmoor Extract (AHE) was formulated in a skin cream and its anti-stinging and anti-redness effect was tested.

Skin cream composition

| Formulation comprising AHE | |
| --- | --- |
| Ingredient | % concentration [w/w] |
| Peat Extract (AHE) | 2.5 |
| Aqua | 73.15 |
| Sorbitan Stearate + Sorbityl Laurate | 3 |
| Myristyl Lactate | 5 |
| Pentylene Glycol | 5 |
| Myristyl Myristate | 5 |
| Stearyl Heptanoate | 5 |
| Pectin + Xanthan Gum + Carrageenan | 0.75 |
| Parfum | 0.6 |

Immediate Soothing Effect

On D0, the test is conducted according to the following method:

The test areas (nasolabial folds) are cleansed using cotton pads which are impregnated with a 10% hydro-alcoholic solution (five times over both test areas). Application of a 10% lactic acid solution to two nasolabial folds (10 times with a cotton bud).

After about 1 to 2 minutes, the subjects are asked concerning the stinging sensations felt on each nasogenial furrow, using the following scale:

0: no stinging

1: mild stinging sensation,

2: moderate stinging sensation,

3: severe stinging sensation.

This is followed by standardized application of the formulation to a defined nasolabial fold (according to the randomization). The subjects are asked concerning the stinging sensations felt on each nasolabial fold immediately (30 seconds), 5 and 15 minutes after product application. If the stinging sensations disappear before t15 minutes, the subject informs the technician and the time is noted in the case report form.

The intensity and the duration of the stinging felt with the formulation are compared to the stinging felt without application of the formulation.

The results are shown in FIG. 4.

After a single application, the formulation induced an immediate soothing effect. A significant decrease of 80% on average in the duration of stinging on the nasolabial fold between the zone with the formulation and the zone without the formulation was observed in favor of the zone with the formulation. This was observed in 100% of the subjects.

After 5 minutes a significant decrease of stinging intensity of 89% on average was observed in 100% of the subjects. After 15 minutes a significant decrease of stinging intensity of 100% on average was observed also in 100% of the subjects and after 30 minutes a significant decrease of stinging intensity of 48% on average was still observed in 86% of the subjects.

Soothing Effect after 28 Days of Use

The stinging-test, perfected by Frosch and Kligman in 1977, evaluates cutaneous reactivity. This test determines the ability which humans have in general to feel stinging after application of a lactic acid solution to nasolabial folds. These areas are reactive and their horny layers very permeable. They are rich in hair follicles and sudoriferous glands which favor product penetration. They also have very developed nervous sensory systems.

Before (D0) and after formulation use (D28), the stinging-test is performed as follows:

The test areas (nasolabial folds) are cleansed using cotton pads which are impregnated with a 10% hydro-alcoholic solution (five times over both test areas).

Application of a 10% lactic acid solution to one nasolabial fold (10 times with a cotton bud) and application of physiologic serum (placebo) to the other side (10 times with a cotton bud).

30 seconds, 2.5 minutes and 5 minutes after application, the subjects' sensations are evaluated according to the following scale:

0: no stinging

1: mild stinging sensation,

2: moderate stinging sensation,

3: severe stinging sensation.

A score is assessed at each time of kinetics (30 seconds, 2.5 minutes and 5 minutes) for the lactic acid side and for the physiologic serum side.

After 28 days of twice daily use, the formulation presented a preventive soothing effect. 95% of the subjects experiences a significant reduction of the cutaneous sensitivity score of 67% on average.

Conclusion

The tested formulation presented a significant soothing and anti-stinging effect in a majority of the test subjects.

Example 5: Anti-Eye-Bag and Anti-Wrinkle Effect of a Formulation Comprising AHE

The Alpine Heilmoor Extract (AHE) was formulated in a skin cream and its anti-aging effect was tested.
Skin cream had the following composition:

TABLE 6

Formulation comprising AHE

| Ingredient | % concentration (w/w) |
|---|---|
| Peat Extract | 1.5 |
| Aqua | 74.15 |
| Sorbitan Stearate + Sorbityl Laurate | 3 |
| Myristyl Lactate | 5 |
| Pentylene Glycol | 5 |
| Myristyl Myristate | 5 |
| Stearyl Heptanoate | 5 |
| Pectin + Xanthan Gum + Carrageenan | 0.75 |
| Parfum | 0.6 |

Study Stages
ON Pre-Inclusion:
Subjects come to the laboratory without having applied any product to the face since the previous evening; are informed about the trial objectives, the procedures and the risks of the study; sign two copies of the Consent Form; and inclusion and non-inclusion criteria are verified.
ON D0:
Subjects come to the laboratory without having applied any product to the face since the previous evening.
Technician asks the subjects about their usual unpleasant sensations; acquires a 3D image of wrinkles on crow's foot using DermaTop®; measures the skin biomechanical properties on temple using Cutometer®; measures the cutaneous hydration rate on temple using Corneometer®; takes 3 macrophotographs: eye bag profile, eye bag front, crow's feet.
Beautician performs a grading of skin radiance under eye and Technician applies 32 µl of product on each eye area and let the subject spread it.
ON D0, 5 minutes after application:
Technician acquires a 3D image of wrinkles on crow's foot using DermaTop®; measures the skin biomechanical properties on temple using Cutometer®; measures the cutaneous hydration rate on temple using Corneometer®; and takes 3 macrophotographs: eye bag profile, eye bag front, crow's feet.
Beautician performs a grading of skin radiance under eye.
Technician explains to the subjects the product application conditions at home and frequency; and gives to the subjects:
  the formulation, which is to be applied to the face twice a day: in the morning and in the evening,
  the daily log to write down their possible unpleasant sensations or medications,
  the subjective evaluation questionnaire to complete and bring back at the next visit.
ON D28 (last application being done the previous day):
Subjects return to the laboratory with no product applied on the face in the morning (except the morning wash) and bring back their daily log, the subjective evaluation questionnaire and study product.

Technician asks the subjects about the possible unpleasant sensations they felt during the study; acquires a 3D image of wrinkles on crow's foot using DermaTop®; measures the skin biomechanical properties on temple using Cutometer®; measures the cutaneous hydration rate on temple using Corneometer®; and takes macrophotographs: eye bag profile, eye bag front, crow's feet.
Beautician performs a grading of skin radiance under eye.
Results
Clinical Grading
The beautician in charge of the study carries out a visual scoring of the cutaneous state and aspect using a structured scale from 0 (dull/grey eye contour) to 10 (bright/radiant eye contour).
The formulation induces a more radiant eye contour after 28 days of twice daily use, results are shown in FIG. 6. An increase of 17% in the average grade of radiance of the eye contour area was measured in 67% of the subjects.
Dermatop
Measurements are done directly in vivo, using the fringe projection system DermaTOP®. This technique consists in calculating a phase image from images with interference fringe projection. This image then allows to determine the height of each point.
The acquisition software allows to obtain 2D and 3D measurements and to determine cutaneous relief parameters on 50 vertical profiles distributed along the zone of interest. An automatic repositioning system allows the precise re-identification of the measurement zone.
The DermaTOP® allocates 50 vertical lines (profiles) on the full image and calculates the parameters listed hereafter for each profile. The analysis is made on the average of the 50 profiles. Ra (Average Roughness) is the arithmetic mean of the absolute values (without differentiation between peaks and valleys) of the heights of the profile length:
  Rz=Average height of the roughness=Average relief
  Rt=Maximum height of the roughness profile=maximum relief amplitude
Rz is the average of 5 single roughness depths, measured within the section In. The single roughness depth is the difference from the highest profile peak to the deepest profile valley within a single measurement section (Ir).
  $(Rz=(Rz_1+Rz_2+Rz_3+Rz_4+Rz_5)/5)$
Rt is the height difference from the highest peak to the deepest valley within the total measurement section (In).
Cutometer
The skin has two rheological properties: a visco-elastic behavior with high elastic component, and a natural tension which varies depending on the age and the studied zone. This tightness is bound to a directional network of lines of the skin (Langer network). The rheological properties of the connective tissue are linked to its structure: collagen fibers and elastin arranged in three-dimensional network play an important role.
SEM 575/MPA 580 Cutometer® is an in vivo non-invasive method to evaluate skin rheological properties: measures of biological extensibility and elasticity variations. The technique consists on the suction of the skin in the orifice of a probe by a constant vacuum pressure and for a constant duration. The depth of penetration of the skin into the probe is measured, without friction and mechanical effects, by using two optical prisms located at the opening of this probe.
According to the principal claim sought (evaluation of the skin elasticity and/or an anti-fatigue effect of the studied product) but also according to the choice of the measured zone, the settings of the Cutometer® probe differ.

Cutaneous skin elasticity measurement is performed with a 2 mm or a 6 mm probe, depending of the measured zone, with one cycle of measurement and a 450 mbar constant pressure (for 2 mm probe) or 350 mbar (for 6 mm probe). Suction and relaxation times are of 3 seconds. Each measurement is an average of two acquisitions.

In this study, cutaneous firmness and elasticity parameters were studied. Results are summarized in FIG. 8 and FIG. 9. The tested formulation presented a firming and anti-aging effect after 28 days of use.

Corneometer

Cutaneous hydration measurements are performed with a Corneometer® CM 825. The measuring principle is based on capacitance measurement. The surface of the measurement head modifies its electrical capacity according to the humidity level of the measured zone. This technique is a well-established method to reproducibly and accurately determine the hydration level of the skin surface, i.e. the humidity level of the most external cutaneous layers of the Stratum Corneum (10-20 μm depth).

A summary of the results is shown in FIG. 10. The tested formulation presented a moisturizing effect 5 minutes after the first application and after 28 days of use. An increase in the cutaneous hydration rate 5 minutes after a single application at the laboratory of about 11% was measured in 81% of the subjects and an increase of 6% in the cutaneous hydration was measured in 53% of the subjects after 28 days of use.

Macrophotographs

The analysis method consists in taking a numeric photograph of the eye profile and then measuring the bag surface. The numerical camera used was a Nikon D7100 camera. The photographs were taken in standardized, indirect light, as it the aperture, speed and distance of the camera. The control of the repositioning takes place directly on data-processing screen thanks to a simultaneous visualization of the images at various times of acquisition. Surface in (pixels) of the bags is measured by analysis of image using the software Adobe Photoshop® 7.0.

Conclusion

Under the study conditions, after 28 days of use, the formulation lead to brighter and more radiant skin, firmer skin, less aged skin and more moisturized skin. The present formulation comprising humic substances thus has a firming and anti-aging effect as well as a moisturizing effect.

Example 6: Use of a Formulation Comprising AHE for the Treatment of Atopic Dermatitis Test subjects (healthy, female/male, 18 years and older with SCORAD of 4-8) in the application test over a period of 4 weeks. Product application twice a day according to usage instructions in the intended area of application. Testing under dermatological control to assess skin compatibility.

Determination of SCORAD (SCORing Atopic Dermatitis) for all test subjects. SCORAD enables objective assessment of extent and intensity of atopic dermatitis together with a subjective assessment of suffering intensity (itching impulse and sleeplessness). Following parameters are evaluated for all corresponding body areas by a grading scale (0-3): erythema, oedema/development of papuleis be calculated by sum of parameter of corresponding body areas and pruritus and sleeplessness. Evaluation before and after period of product application.

Example 7: Use of a Formulation Comprising AHE for the Treatment of Psoriasis

Test subjects (healthy, female/male, 18 years and older with PASI of at least 3) in the application test over a period of 4 weeks. Product application twice a day according to usage instructions in the intended area of application. Testing under dermatological control to assess skin compatibility.

Determination of PASI-Scores (Psoriasis Area and Severity Index) for all test subjects. Following parameters of corresponding body areas are evaluated in total: redness, raised skin, shedding (flaking). PASI score is calculated by sum of all 3 parameter of all corresponding body areas. Evaluation before and after period of product application.

Example 8: Wound Healing

Experimental Setup

A human Keratinocyte cell line (HaCat) was cultivated in 6 well plates to reach a dense cell layer. Subsequently the monolayer was injured with a mechanical device leading to a cross formed scratch in the monolayer. Upon scratching cells were washed once with PBS and treated with the test substances outlined above as well as with appropriate controls. The ingrowth of cells was monitored/documented for another 72 hours to the point where the cross formed injury of the monolayer was recovered with cells. At that point cells were washed and harvested. Cell extracts were generated by treatment with PBS/1% Triton X100 (30 min on ice). Subsequently cell extracts were analysed by SDS-PAGE/Western Blotting using antibodies directed towards the proliferation markers E-Cadherin and Paxillin (FIG. 10 and FIG. 11).

Cells were treated with AHE solutions, comprising either 1% or 5% AHE in PBS (phosphate buffered saline). The dry extract was generated as described in Example 1, and then dissolved in PBS at 37° C. for 72 hours using a weight/volume ratio of 0.1 g/mL, 0.2 g/mL or 0.5 g/mL, respectively.

For comparison, cells were also treated with Fulvic Acid and Charcoal, EGF was used as positive control, Medium without active substance was used as negative control.

Results

When a skin injury occurs, the movement and proliferation of keratinocytes is essential for successful and efficient wound healing.

As expected, treatment with EGF (10 ng/ml) showed that the monolayer of keratinocytes regenerated well within 72 hours, even across the borders of the cross formed by scratching as described above. The keratinocytes showed extremely high density of the monolayer (FIG. 12B).

Using AHE, the keratinocytes also regenerated well and showed significant growth which reached the border of the cross within 72 hours after scratching. Cells treated with 1% and 5% AHE solution in culture medium 72 h upon mechanical scratching regenerated well. The condition of both cultures were better than a culture treated with Fulvic Acid (FIG. 12A).

Using charcoal, no living cells could be observed 72 hours after mechanical scratching (FIG. 12A).

Regarding potential effects on the expression of cell adhesion markers E-Cadherin and Paxillin it could be observed that treatment with AHE (1% and 5%) resulted in a downregulation of the 80 kDa isoform of E-Cadherin comparable to the treatment with EGF upon mechanical scratching and regeneration. In addition to that it could be observed that treatment with AHE (with and without scratching) leads to a upregulation of the cell adhesion molecule Paxillin (FIG. 11). This effect was also observed upon treatment with EGF and Fulvic Acid (FIGS. 10 and 11).

These results clearly show, that the Alpine Heilmoor Extract significantly improves wound healing.

Example 9: Skin Barrier—Membrane Barrier Enhancement

To determine the effects of the Alpine Heilmoor Extract on the stability of the membrane barrier, human Keratinocytes (HaCat) were analysed in a 3-dimensional cell culture system. Hereby, cells ($5 \times 10^4$/insert) were seeded on culture inserts of the system and cultivated in 24 well plates for 14 days with medium exchange in 3-day intervals and permanent monitoring of the TEER value. Reaching a constant TEER value cells were stimulated with heat inactivated C. acnes ($10^7$ cells/well) for 16 h. Subsequently, cells were washed and incubated with described $2^{nd}$ line substances (i.e. AHE solutions, comprising either 1%, 2% or 5% AHE in PBS, generated as described in Example 8) for 24 hours. After this step, cells were washed and cell extracts were prepared by incubation with PBS/1% Triton X100. Cell extracts were subjected to SDS-PAGE/Western Blotting with special regard to stabilization markers Keratin 10, Keratin 16, Ki67, and Filaggrin. The following approaches were performed:

TABLE 7

| Experiment Setup |
| --- |
| Primary stimulation (16 h) |
| 1. Negative control (Medium) |
| 2. Positive control (0.1% Triton X100) |
| 3. Medium |
| 4. Medium |
| 5. Medium |
| 6. Medium |
| 7. Medium |
| 8. Medium |
| 9. C. Acnes |
| 10. C. Acnes |
| 11. C. Acnes |
| 12. C. Acnes |
| 13. C. Acnes |
| 14. C. Acnes |
| 15. C. Acnes |
| Wash: 2 x with 300 µl PBS |
| Determination of TEER Value: all approaches |
| Incubation with 2nd line substances |
| 1. Negativkontrolle (Medium) |
| 2. Positivkontrolle (0.1% Triton X100) |
| 3. Medium/AHE Extract, cosmetic grade 1% |
| 4. Medium/AHE Extract, cosmetic grade 2% |
| 5. Medium/AHE Extract, cosmetic grade 5% |
| 6. Medium/Fulvic Acid 1% |
| 7. Medium/Charcoal 1% |
| 8. Medium/EGF |
| 9. Medium |
| 10. AHE Extract, cosmetic grade 1% |
| 11. AHE Extract, cosmetic grade 2% |

TABLE 7-continued

| Experiment Setup |
| --- |
| 12. AHE Extract, cosmetic grade 5% |
| 13. Fulvic Acid 1% |
| 14. Charcoal 1% |
| 15. EGF |
| Determination of TEER Value |
| Wash (see above) |
| Extract preparation |
| SDS-PAGE/Western Blotting |

Results

Effects of the indicated stimuli/second line substances were evaluated by determination of the expression levels of membrane markers Cytokeratin 10/Cytokeratin 16/Fillagrin and Ki67. Keratinocyte differentiation marker: Keratin 10 (also referred to as Cytokeratin 10). Keratinocyte overexpression marker: Keratin 16 (also referred to as Cytokeratin 16).

As shown in FIG. 13, a specific band for Cytokeratin 10 (CK10) with an apparent molecular weight slightly above the 50 kDA standard Band (MW CK10: 58 kDa) could be detected in all settings. A clear induction of the band was visible in extracts of HaCat cells treated with 2% AHE (see lane 5 of gel 1 in FIG. 13). An even stronger induction could be observed when the HaCat cells were stimulated with C. acnes followed by a subsequent regeneration phase with 2% AHE (see lane 6 of gel 1 in FIG. 13). An induction of CK10 could also be observed in cells treated with the positive control EGF (see lane 9 of gel 1 in FIG. 13).

Surprisingly, induction of cytokeratin 10 was significantly better using AHE than the positive control EGF (FIGS. 13 and 15).

As shown in FIG. 14, a specific band for Cytokeratin 16 with an apparent molecular weight slightly above the 50 kDA standard Band (MW CK16: 51 kDa) could be detected only in settings where the HaCat cells were incubated with 1% AHE (lane 3 of gel 1 in FIG. 14), in settings were cells were stimulated with C.acnes with a subsequent treatment with 1% AHE (lane 4 of gel 1 in FIG. 14), as well as in settings were the cells were treated with EGF (gel 2, lines 7 and 8).

However, strong reactivities could be seen with a protein complex migrating at an apparent MW of about 75 kDa in settings treated with C.acnes with a subsequent regeneration in 2% AHE (FIG. 14, gel 1, line 6) as well as in settings treated with 5% AHE (FIG. 14, gel 1, lines 7 and 8). This complex is also visible in settings treated with the positive control EGF (FIG. 14, gel 1, line 9 and gel 2, line 6).

Taken together, these results show that AHE plays an important role in the regulation of the skin barrier by increasing the expression of Keratin 10 and by decreasing the expression of Keratin 16, and it does so to an even bigger extent than EGF. Alpin Heilmoor Extract thus leads to an improvement of the skin barrier function.

Example 10: Membrane Barrier Enhancement CaCo2

CaCo2 monolayers are typically used as an in vitro model of the human small intestinal mucosa to predict the permeability of orally administered drugs.

To determine the effects of the test substances on the stability on the human gut barrier, human colorectal cells (CaCo2) were analysed in a 3-diemsional cell culture system. Cells ($5 \times 10^4$/insert) were seeded on culture inserts of the system and cultivated in 24 well plates for 14 days with medium exchange in 3-day intervals and permanent monitoring of the TEER value. Reaching a constant TEER value, cells were stimulated with a combination of IL-1beta and THF-alpha for 16 h. Subsequently, cells were washed and incubated with described 2$^{nd}$ line substances (i.e. AHE solutions, comprising either 1%, 2% or 5% AHE in PBS, generated as describe din Example 8) for 24 hours. After this step cells were washed and cell extracts were prepared by incubation with PBS/1% Triton X100. Cell extracts are ready for SDS-PAGE/Western Blotting. The following approaches were performed:

TABLE 8

Experiment setup

Primary stimulation (16 h)

1. Negative control (Medium)
2. Positive control (0.1 % Triton X100)
3. Medium
4. Medium
5. Medium
6. Medium
7. Medium
8. Medium
9. IL1alpha/TNFalpha
10. IL1alpha/TNFalpha
11. IL1alpha/TNFalpha
12. IL1alpha/TNFalpha
13. IL1alpha/TNFalpha
14. IL1alpha/TNFalpha
15. IL1alpha/TNFalpha
    Wash: 2 × with 300 □| PBS
Determination of TEER Value: all approaches
Incubation with 2nd line substances 1. Negativkontrolle (Medium)
2. Positivkontrolle (0.1% Triton X100)
3. Medium/AHE Extract, cosmetic grade 1%
4. Medium/AHE Extract, cosmetic grade 2%
5. Medium/AHE Extract, cosmetic grade 5%
6. Medium/Fulvic Acid 1%
7. Medium/Charcoal 1%
8. Medium/EGF
9. Medium
10. Alpin AHE Extract, cosmetic grade 1%
11. Alpin AHE Extract, cosmetic grade 2%
12. Alpin AHE Extract, cosmetic grade 5%
13. Fulvic Acid 1%
14. Charcoal 1%
15. EGF
    Determination of TEER Value
    Wash (see above)
    Extract preparartion
    SDS-PAGE/Western Blotting Results CaCo2 cells created a stable TEER-value in a 3-dimensional cell culture model. After 2 weeks culture a stable TEER>1000 Ω/cm² could be detected in all cultures. After further culturing an increase in the TEER-value could be detected. Taking a closer look on the test substance AHE, a strong increase in the TEER-value could be observed in the settings with 1% and 2% AHE during the regeneration phase, in the settings stimulated with IL-1beta/TNF-alpha, and in the non-stimulated controls (see Table 9 below and FIG. 17). Effects were even stronger than with the positive control EGF. Compared to the medium control, charcoal (CH) and Fulvic Acid (FA) showed inhibitory effects on the membrane integrity.

TABLE 9

CaCo2 TEER values

| | CaCo2 | | | | | |
|---|---|---|---|---|---|---|
| | Medium | AHE 1% | AHE 2% | CH | FA | EGF |
| 1 d after seeding | | | About 200 Ω/cm² | | | |
| D13 (1 d before stimulation) | | | 1500 Ω/cm² | | | |
| D15 (1 d after stimulation with IL1alpha/TNF-alpha) | 3600 | 4900 | 4600 | 3000 | 2400 | 4800 |
| D15 (non stimulated controls) | 3200 | 4700 | 4300 | 2700 | 2900 | 4000 |
| D17 (after regeneration phase with extracts: stimulated skin) | 6200 | 7900 | 11500 | 4800 | 2000 | 9600 |
| D17 (after regeneration phase with extracts: non stimulated controls) | 4800 | 9000 | 8500 | 3800 | 4200 | 7200 |

Taken together, these results show, that AHE has a very high absorption rate. The absorption rate was compared to other compounds such as charcoal, fulvic acid and EGF, and was found to be significantly better (compared to charcoal and fulvic acid) or at least of similar levels (compared to EGF).

Example 11: Inflammation

Potential immune modulatory effects were determined on reconstructed human epidermis (RHE) using a 3D Skin Modell (Cell systems). In the first step the skin patches are stimulated with specific controls and stimuli for a defined time period. In this context it had to be considered that different stimuli require different incubation times. The incubation with heat inactivated *C.acnes* (10$^7$ cells/approach) as well as the direct incubation with the test substances (AHE/FA/BIS) was performed for 16h at 37° C. The AHE test substances comprised AHE solutions, comprising either 1%, 2% or 5% AHE in PBS, generated as described in Example 8. The incubation with the positive control (5% SDS) was performed for 20 min (37° C.). After the primary stimulation step skin patches were washed (PBS 3×300 μl) and subjected to a regeneration phase (24h/37° C.) in presence of the indicated substances (CM/AHE/FA/CH/BIS). After this incubation phase the culture medium of each approach was isolated and used to stimulate human PBMCs. Hereby 100 μl of the RHE culture was added cultures of human PBMCs (1×10$^6$ cells in 300 μl culture medium) and incubated for additional 16 h (37° C.). After this incubation step, PBMCs were separated by centrifugation and the supernatant was saved for the MSD multiplexing platform. In parallel the cells of the RHE culture were subjected to cell lysis (1% SDS, 30 min/4° C. agitation). Cell extracts were saved for the MSD multiplexing platform.

TABLE 10

| Step | Description | 1st incubation step/ regeneration | Stimulation of PBMCs | Endpoint |
|---|---|---|---|---|
| | General procedure: primary incubation/wash/ Regeneration/prepration of cell extracts from the RHE stimulation of PBMCs/read out on the Mesoscale multiplexing platform | | 50 ml aliquot from the bottom phase of the culture after the regeneration step | Read out system |
| 1 | Negative control: culture medium (CM) | CM/wash/CM | Stimulate human PBMCs (1 × $10^6$ cells in 24 well) with 25% of the primary incubation step (after regeneration) Analyze PBMC supernatant after stimulation Prepare cell extract from the RHE culture after regeneration | Analysis of extracts on the MSD multiplexing platform |
| 2 | Positive control 5% SDS | 5% SDS/wash/CM | | |
| 3 | AHE 1% | CM/wash/ AHE/FA/BIS | | |
| 4 | AHE 2% | | | |
| 5 | AHE 5% | | | |
| 6 | FA 1% | | | |
| 7 | BIS 1% | | | |
| 8 | C. Acnes (CA) 1 × $10^7$ Cells | CA/wash/CM | | |
| 9 | C. acnes/ AHE 1% | CA/wash/AHE/ FA/CH/BIS | | |
| 10 | C. acnes/ AHE 2% | | | |
| 11 | C. acnes/ AHE 5% | | | |
| 12 | C. acnes/FA 1% | | | |
| 13 | C. acnes/CH/1% | | | |
| 14 | C. acnes/BIS 1% | | | |

MSD Multiplexing Using the U-Plex Platform:

Using the MSD U-PLEX it is possible to create an individualized multiplex assays for any combination of analytes. Hereby biotinylated capture reagents are coupled to U-PLEX Linkers. The U-PLEX Linkers then self-assemble onto unique spots on the U-PLEX plate. After analytes in the sample bind to the capture reagents, detection antibodies conjugated with electro-chemiluminescent labels (MSD GOLD SULFO-TAG) bind to the analytes to complete the sandwich immunoassay. Using this technology, the following markers were immobilized:

U-PLEX Human IFN-γ, U-PLEX Human IL-16, U-PLEX Human IL-2, U-PLEX Human IL-4, U-PLEX Human IL-5, U-PLEX Human IL-6, U-PLEX Human IL-8, U-PLEX Human IL-12p70, U-PLEX Human IL-13, U-PLEX Human IL-17A, U-PLEX Human IL-17F, U-PLEX Human IL-22, U-PLEX Human IL-23, U-PLEX Human TNF-α. U-PLEX Human TGF-β1. All steps were performed according to the supplier's protocol.

Results

As described above, the Reconstructed human epidermis (RhE) was stimulated with the indicated substances and stimuli (Sample # Description, Tables 11-21) for 16 h. Upon this step the RhE was washed and in incubated in a second line with the indicated substances or culture medium. As controls, the RhE was treated in the first line with PBS and subsequently with culture medium. As further controls the PBMCs were treated with culture medium alone, with heat inactivated C. acnes and with pooled supernatant (SN) of the RhEs before stimulation. For Mesoscale analysis, the supernatant of the PBMC culture (PBMCs) was compared with a cell extract of the RhE prepared after the individual incubation steps (RhEs) and the supernatant of the RhEs after the stimulation steps (SN RhEs). RhE treated in the first and second line with culture medium (Rhe NC) can be used as negative control in all settings.

FIG. 18 shows a summary of the results discussed in more detail below. FIG. 18 clearly shows that AHE 1% and AHE2% represses expression of inflammatory factors, such as TNFα, IL-1β, IL-6 and IL-8, following stimulation ("STIM") of inflammation by exposure of the cells to C. acnes.

FIG. 19 also shows a summary of the results discussed in more detail below. FIG. 19 shows an overview of the inhibitory effect on inflammatory factors TNFα, IL-1β, IL-6 and IL-8 of AHE 1% following stimulation ("STIM") of inflammation by exposure of the cells to C. acnes. This figure thus clearly shows that AHE 1% is capable of significantly repressing inflammation.

TNFα

The results, summarized in Table 11, gave reasonable results in a way that supernatant from the Negative Control (1) indicated a TNF base line. A clear induction could be observed by incubation of PBMCs with the supernatant of C.acnes stimulated PBMCs (8) and direct incubation of PBMCs with heat inactivated C. acnes (17). In this case elevated TNF levels could already be observed in the supernatant of the C. acnes treated RhE. Taking a closer look at the test sample AHE especially the 1% extract shows a clear repression of the TNF induction of PBMCs as well as TNF secretion from the RhE. An induction of TNF-alpha in the cell extracts could not be observed.

TABLE 11

| | TNFα concentration [pg/ml] | | |
|---|---|---|---|
| Sample #/Description | PBMCs | RhEs | SN RhEs |
| 1 RhE NC | 33.2 | n.a. | 13.3 |
| 2 Rhe PC | 24.0 | n.a. | n.a. |
| 3 AHE 1% | 30.0 | n.a. | 19.3 |
| 4 AHE 2% | 24.5 | n.a. | 0.4 |
| 5 AHE 5% | 38.6 | n.a. | 33.8 |
| 6 Fulvic Acid 1% | 55.7 | n.a. | 22.0 |
| 7 Bisabolol 1% | 29.8 | n.a. | 17.1 |
| 8 C. acnes | 108.7 | n.a. | 44.5 |
| 9 C. acnes + AHE 1% | 35.4 | n.a. | 15.5 |

TABLE 11-continued

| TNFα concentration [pg/ml] | | | |
|---|---|---|---|
| Sample #/Description | PBMCs | RhEs | SN RhEs |
| 10 C. acnes + AHE 2% | 44.5 | n.a. | 20.7 |
| 11 C. acnes + AHE 5% | 66.4 | n.a. | 2.6 |
| 12 C. acnes + Fulvic Acid 1% | 62.9 | n.a. | 4.5 |
| 13 C. acnes + Charcoal 1% | 45.8 | n.a. | n.a. |
| 14 C. acnes + Bisabolol 1% | 51.6 | n.a. | 8.6 |
| 15 PBS/Medium | 37.5 | n.a. | 8.2 |
| 16 PBMC + Medium | 23.8 | / | / |
| 17 PBMC + C. acnes direct | 454.1 | / | / |
| SN Pool before stimulation | / | / | 157.2 |

IL-1β

The results, summarized in Table 12, gave reasonable results in a way that supernatant from the Negative Control (1) indicated a IL1-beta base line. A clear induction could be observed with PBMCs stimulated with supernatant from C.acnes treated RhE (8). This effect—somewhat stronger—could be observed by direct incubation of PBMCs with heat inactivated C. acnes (17). Taking a closer look at the test sample, AHE, especially the 1% extract, shows a repression of the IL-1beta induction of PBMCs as well as TNF secretion from the RhE. Somewhat striking here is the fact that PBMCs incubated with culture medium showed a clear induction of IL-1beta (16). An induction of IL1-beta in the cell extracts could not be observed.

TABLE 12

| IL-1β concentration [pg/ml] | | | |
|---|---|---|---|
| Sample #/Description | PBMCs | RhEs | SN RhEs |
| 1 RhE NC | 908 | n.a. | 2.1 |
| 2 Rhe PC 5% SDS | 1133 | n.a. | n.a. |
| 3 AHE 1% | 1448 | n.a. | 4.6 |
| 4 AHE 2% | 1259 | n.a. | 1.8 |
| 5 Fulvic Acid 1% | 1504 | n.a. | 4.5 |
| 6 Bisabolol 1% | 1277 | n.a. | 5.4 |
| 7 C. acnes | 1830 | n.a. | 5.6 |
| 8 C. acnes + AHE 1% | 1581 | n.a. | 3.4 |
| 9 C. acnes + AHE 2% | 1613 | n.a. | 5.8 |
| 10 C. acnes + Fulvic Acid 1% | 1504 | n.a. | 4.9 |
| 11 C. acnes + Charcoal 1% | 1445 | n.a. | 6.3 |
| 12 C. acnes + Bisabolol 1% | 1525 | n.a. | 8.5 |
| 13 PBS/Medium | 1498 | 5.7 | 3.9 |
| 14 PBMC + Medium | 2382.2 | / | / |
| 15 PBMC + C. acnes direct | 1552 | / | / |
| SN Pool before stimulation | / | / | 16.6 |

IL-4

The results, summarized in Table 13, gave reasonable results in a way that supernatant from the Negative Control (1) indicated a IL1-4 base line. A clear reduction of IL-4 expression using AHE 1% could be observed following stimulation of PBMCs with heat inactivated C. acnes (see FIG. 17 and Sample #7 of Table 13).

TABLE 13

| IL-4 concentration [pg/ml] | | | |
|---|---|---|---|
| Sample #/Description | PBMCs | RhEs | SN RhEs |
| 1 RhE NC | 6.4 | n.a. | n.a. |
| 2 Rhe PC 5% SDS | 9.0 | n.a. | n.a. |
| 3 AHE 1% | 9.1 | n.a. | n.a. |
| 4 Fulvic Acid 1% | 10.1 | n.a. | n.a. |

TABLE 13-continued

| IL-4 concentration [pg/ml] | | | |
|---|---|---|---|
| Sample #/Description | PBMCs | RhEs | SN RhEs |
| 5 Bisabolol 1% | 9.1 | n.a. | n.a. |
| 6 C. acnes | 10.4 | n.a. | n.a. |
| 7 C. acnes + AHE 1% | 9.5 | n.a. | n.a. |
| 8 C. acnes + Fulvic Acid 1% | 10.4 | n.a. | n.a. |
| 9 C. acnes + Charcoal 1% | 9.6 | n.a. | n.a. |
| 10 C. acnes + Bisabolol 1% | 10.1 | n.a. | n.a. |
| 11 PBS/Medium | 10.7 | n.a. | 11.4 |
| 12 PBMC + Medium | 10.5 | / | / |
| 13 PBMC + C. acnes direct | 11.0 | / | / |
| SN Pool before stimulation | / | / | n.a. |

IL-5

The results, summarized in Table 14, gave reasonable results in a way that supernatant from the Negative Control (1) indicated an IL-5 base line. A clear reduction of IL-5 expression using AHE 1% could be observed following stimulation of PBMCs with heat inactivated C. acnes (see FIG. 16 and Sampe #7 in Table 14).

TABLE 14

| IL-5 concentration [pg/ml] | | | |
|---|---|---|---|
| Sample #/Description | PBMCs | RhEs | SN RhEs |
| 1 RhE NC | 13.3 | n.a. | n.a. |
| 2 Rhe PC 5% SDS | 25.4 | n.a. | 1.0 |
| 3 AHE 1% | 18.9 | n.a. | n.a. |
| 4 Fulvic Acid 1% | 22.9 | n.a. | 0.9 |
| 5 Bisabolol 1% | 18.2 | n.a. | 0.0 |
| 6 C. acnes | 24.2 | n.a. | 1.0 |
| 7 C. acnes + AHE 1% | 19.3 | n.a. | 0.5 |
| 8 C. acnes + Fulvic Acid 1% | 24.8 | n.a. | 1.5 |
| 9 C. acnes + Charcoal 1% | 18.3 | n.a. | 0.8 |
| 10 C. acnes + Bisabolol 1% | 24.1 | n.a. | 1.1 |
| 11 PBS/Medium | 19.9 | n.a. | n.a. |
| 12 PBMC + Medium | 23.9 | / | / |
| 13 PBMC + C. acnes direct | 21.4 | / | / |
| SN Pool before stimulation | / | / | 1.5 |

IL-6

The results, summarized in Table 15, gave reasonable results in a way that supernatant from the Negative Control (1) indicated an IL-6 base line. A clear induction could be observed by direct incubation of PBMCs with heat inactivated C. acnes (17). Effects could also be observed with PBMCs stimulated with supernatant from C.acnes treated RhE (Sample #8). In this case, elevated IL-6 levels could already be observed in the supernatant of the C. acnes treated RhE. Taking a closer look at the test sample AHE, especially the 1% extract shows a clear repression of IL-6 induction in PBMCs as well as IL-6 secretion from the RhEs (Sample #9, PBMCs and SN RhEs). Comparable results could be obtained with Fulvic acid (Sample #12). An induction of IL-6 in the cell extracts could not be observed.

TABLE 15

| IL-6 concentration [pg/ml] | | | |
|---|---|---|---|
| Sample #/Description | PBMCs | RhEs | SN RhEs |
| 1 RhE NC | 9126.3 | n.a. | 16.2 |
| 2 Rhe PC 5% SDS | 12909.3 | n.a. | 0.3 |
| 3 AHE 1% | 11294.3 | n.a. | 60.3 |
| 4 AHE 2% | 9788.8 | n.a. | 10.0 |
| 5 AHE 5% | 13398.7 | n.a. | 128.5 |

TABLE 15-continued

IL-6 concentration [pg/ml]

| Sample #/Description | PBMCs | RhEs | SN RhEs |
|---|---|---|---|
| 6 Fulvic Acid 1% | 13190.6 | n.a. | 20.1 |
| 7 Bisabolol 1% | 12302.5 | n.a. | 30.8 |
| 8 C. acnes | 15930.6 | n.a. | 79.2 |
| 9 C. acnes + AHE 1% | 12971.6 | n.a. | 26.1 |
| 10 C. acnes + AHE 2% | 12637.1 | n.a. | 37.9 |
| 12 C. acnes + Fulvic Acid 1% | 12870.2 | n.a. | 28.5 |
| 13 C. acnes + Charcoal 1% | 13060.8 | n.a. | 324.7 |
| 14 C. acnes + Bisabolol 1% | 13038.0 | n.a. | 75.1 |
| 15 PBS/Medium | 14522.1 | n.a. | 22.5 |
| 16 PBMC + Medium | 13900.5 | / | / |
| 17 PBMC + C. acnes direct | 17907.0 | / | / |
| SN Pool before stimulation | / | / | 181.4 |

IL-8

Concerning the IL-8 expression, no obvious differences could be observed upon PBMC stimulation. In contrast to that, a clear induction of IL-8 expression was detected in cell extracts of the RhEs upon stimulation with C.acnes (Sample #8 in Table 16). This induction could be strongly repressed by $2^{nd}$ line incubation with AHE (1%/2%/5%) and Fulvic acid (Sample #9-12 RHEs, Table 16). An induction of IL-8 by C.acnes was also observed in the supernatant of the RHEs. In this case, a repressive effect of AHE 1% could be observed too (Sample #9 SN RHEs, Table 16. Striking in this series is the high IL-8 level of the RhE before stimulation.

TABLE 16

IL-8 concentration [pg/ml]

| Sample #/Description | PBMCs | RhEs | SN RhEs |
|---|---|---|---|
| 1 RhE NC | 42673.2 | 102.4 | 1221.4 |
| 2 Rhe PC 5% SDS | 43111.6 | 33.5 | 77.2 |
| 3 AHE1% | 44140.0 | 34.4 | 2380.4 |
| 4 AHE 2% | 43649.1 | 31.8 | 887.9 |
| 5 AHE 5% | 44160.0 | 40.1 | 4470.7 |
| 6 Fulvic Acid 1% | 43431.7 | 36.0 | 2108.3 |
| 7 Bisabolol 1% | 44123.3 | 68.9 | 2459.3 |
| 8 C. acnes | 43323.5 | 317.7 | 2845.0 |
| 9 C. acnes + AHE 1% | 43971.0 | 33.3 | 1532.1 |
| 10 C. acnes + AHE 2% | 43690.2 | 36.2 | 3057.5 |
| 11 C. acnes + AHE 5% | 44262.2 | 39.6 | 3153.1 |
| 12 C. acnes + Fulvic Acid 1% | 43680.0 | 40.6 | 2199.7 |
| 13 C. acnes + Charcoal 1% | 44617.2 | 95.6 | 2901.8 |
| 14 C. acnes + Bisabolol 1% | 43765.9 | 58.1 | 4317.3 |
| 15 PBS/Medium | 44325.1 | 96.2 | 2320.9 |
| 16 PBMC + Medium | 43532.3 | / | / |
| 17 PBMC + C. acnes direct | 44450.6 | / | / |
| SN Pool before stimulation | / | / | 6682.2 |

INF-γ

The results, summarized in Table 17, gave reasonable results in a way that supernatant from the Negative Control (Sample #1) indicated a IFN-γ base line. A clear induction of IFN-γ expression could be observed by incubation of PBMCs with the supernatant of C.acnes stimulated PBMCs (Sample #7) and direct incubation of PBMCs with heat inactivated C. acnes (Sample #15). Following incubation with AHE 1%, expression of IFN-γ was clearly reduced in PBMCs (Sample #8) and following incubation with AHE 2%, expression of IFN-γ was clearly reduced in SN RHEs (Sample #9).

TABLE 17

INF-γ concentration [pg/ml]

| Sample #/Description | PBMCs | RhEs | SN RhEs |
|---|---|---|---|
| 1 RhE NC | 51.0 | 114.7 | n.a. |
| 2 Rhe PC 5% SDS | 114.7 | n.a. | n.a. |
| 3 AHE 1% | 91.3 | n.a. | n.a. |
| 4 AHE 2% | 107.8 | 167.7 | n.a. |
| 5 Fulvic Acid 1% | 116.5 | n.a. | n.a. |
| 6 Bisabolol 1% | 90.5 | 8.3 | n.a. |
| 7 C. acnes | 112.7 | 29.9 | 16.2 |
| 8 C. acnes + AHE 1% | 96.5 | 204.5 | n.a. |
| 9 C. acnes + AHE 2% | 116.7 | n.a. | 9.1 |
| 10 C. acnes + Fulvic Acid 1% | 112.2 | n.a. | n.a. |
| 11 C. acnes + Charcoal 1% | 98.0 | 32.6 | n.a. |
| 12 C. acnes + Bisabolol 1% | 124.4 | n.a. | 13.9 |
| 13 PBS/Medium | 99.3 | 320.6 | n.a. |
| 14 PBMC + Medium | 114.7 | / | / |
| 15 PBMC + C. acnes direct | 125.5 | / | / |
| SN Pool before stimulation | / | / | 8.6 |

IL-12p70

The results, summarized in Table 18, gave reasonable results in a way that supernatant from the Negative Control (Sample #1) indicated an IL-12p70 base line. A clear induction could be observed by incubation of PBMCs with the supernatant of C.acnes stimulated PBMCs (Sample #7) and direct incubation of PBMCs with heat inactivated C. acnes (Sample #15). The induction of IL-12p70 expression in C.acnes-stimulated PBMCs (Sample #7) is repressed by second line incubation with AHE 1% (Sample #8).

TABLE 18

IL-12p70 concentration [pg/ml]

| Sample #/Description | PBMCs | RhEs | SN RhEs |
|---|---|---|---|
| 1 RhE NC | 26.9 | 9.4 | n.a. |
| 2 Rhe PC 5% SDS | 63.0 | n.a. | n.a. |
| 3 AHE 1% | 46.7 | n.a. | n.a. |
| 4 AHE 5% | 50.9 | n.a. | n.a. |
| 5 Fulvic Acid 1% | 67.1 | n.a. | n.a. |
| 6 Bisabolol 1% | 51.3 | n.a. | n.a. |
| 7 C. acnes | 63.8 | n.a. | 1.9 |
| 8 C. acnes + AHE 1% | 48.3 | n.a. | n.a. |
| 9 C. acnes + AHE 5% | 57.0 | n.a. | 1.1 |
| 10 C. acnes + Fulvic Acid 1% | 68.2 | n.a. | 1.5 |
| 11 C. acnes + Charcoal 1% | 55.7 | n.a. | n.a. |
| 12 C. acnes + Bisabolol 1% | 69.9 | n.a. | 3.3 |
| 13 PBS Medium | 51.2 | 174.6 | 0.9 |
| 14 PBMC + Medium | 71.5 | / | / |
| 15 PBMC + C. acnes direct | 54.3 | / | / |
| SN Pool before stimulation | / | / | n.a. |

IL-13

The results, summarized in Table 19, gave reasonable results in a way that supernatant from the Negative Control (Sample #1) indicated an IL-13 base line. A clear induction of IL-13 expression could be observed by incubation of PBMCs with the supernatant of C.acnes (Sample #8) and direct incubation of PBMCs with heat inactivated C. acnes (Sample #13). The expression of IL-13 in C.acnes-stimulated PBMCs (Sample #6) is repressed by second line incubation with AHE 1% (Sample #7).

TABLE 19

IL-13 concentration [pg/ml]

| Sample #/Description | PBMCs | RhEs | SN RhEs |
|---|---|---|---|
| 1 RhE NC | 84.0 | 760.8 | n.a. |
| 2 Rhe PC 5% SDS | 220.6 | n.a. | n.a. |
| 3 AHE 1% | 152.9 | n.a. | n.a. |
| 4 Fulvic Acid 1% | 182.8 | n.a. | n.a. |
| 5 Bisabolol 1% | 157.9 | n.a. | n.a. |
| 6 C. acnes | 180.0 | n.a. | n.a. |
| 7 C. acnes + AHE 1% | 160.9 | n.a. | n.a. |
| 8 C. acnes + Fulvic Acid 1% | 179.8 | n.a. | n.a. |
| 9 C. acnes + Charcoal 1% | 161.1 | n.a. | n.a. |
| 10 C. acnes + Bisabolol 1% | 186.6 | n.a. | n.a. |
| 11 PBS Medium | 160.7 | n.a. | n.a. |
| 12 PBMC + Medium | 189.6 | / | / |
| 13 PBMC + C. acnes direct | 161.9 | / | / |
| SN Pool before stimulation | / | / | n.a. |

Conclusion

When human peripheral blood mononuclear cells are exposed to stress, such as e.g. C.acnes exposure, various cytokines are produced in keratinocytes, which causes an inflammatory reaction. As shown by the results (summarized in FIG. 16), Alpin Heilmoor Extract effectively inhibits the generation of such inflammatory cytokines in the blood.

Example 12: Hair Fibres

E-Cadherin plays an important role in improving the elasticity of hair fibres and in preventing hair loss. Keratin 10 and 16 have an important impact during the development of hair follicles. As described in Example 8 and shown in FIGS. 10, 11, 13, 14 and 15, AHE plays an important role in regulating those factors.

In this example, the effect of AHE on hair fibres of human subjects was tested by applying a hair mask comprising 5% AHE directly to the hair of human subjects. Tensile strength and Young's modulus of untreated and treated hair fibres were determined.

Blond Hair

A single application of a hair mask 5% AHE on hair fibres of 25 blond subjects
A: blond, untreated hair—N=25 subjects
B: blond, treated hair—N=25 subjects

TABLE 20

Effect of AHE 5% on blond hair fibres

| Factor | % change and significance |
|---|---|
| A/B Tensile strength 15% (N/$\mu m^2$) | −8.6%, p < 0.001, up to −20.8% |
| A/B Young's modulus (N/$\mu m^2$) | −7.3%, p < 0.001, up to −29.1% |

White Hair

A single application of a hair mask 5% AHE on hair fibres of 25 white haired subjects
C: white, untreated hair—N=25 subjects
D: white, treated hair—N=25 subjects

TABLE 21

Effect of AHE 5% on white hair fibres

| Factor | % change and significance |
|---|---|
| C/D Tensile strength 15% (N/$\mu m^2$) | −11.2%, p < 0.001, up to −23.5% |
| C/D Young's modulus (N/$\mu m^2$) | −9.9%, p < 0.001, up to −29.47% |

Results

AHE significantly reduces tensile strength and Young's modulus of both white and blonde hair. These results clearly show, that AHE improves flexibility and elasticity of hair fibres.

The invention claimed is:

1. A method of providing a cosmetic dermatologic treatment to a subject, comprising the step of administering a cosmetic composition comprising a dry extract of peat with a content of at least 8% (w/w) organic matter comprising at least 20% (w/w) fulvic acid, at least 60% (w/w) humic acid, and at least 8% (w/w) ulmic acid to the subject, wherein the extract is characterized by having a maximum average particle size of 20 micrometers ($\mu$m).

2. The method of claim 1, wherein the cosmetic composition is administered to:
   i. skin of the subject, in order to reduce inflammatory effects, reduce acne lesions, moisturize skin, purify skin, achieve anti-stinging, soothing, and/or anti-aging of skin, improve wound healing, improve skin barrier function, reduce skin damage caused by air-pollution or improve sebo-regulating;
   ii. hair of the subject, in order to improve flexibility of hair fibers, elasticity of hair fibers, hair volume, reduce flakiness on top of the hair, improve shine of hair fibers, repair hair fibers, improve scalp conditions and/or reduce dandruff; or
   iii. oral mucosa of the subject, in order to improve gum condition, reduce periimplantitis and periodontitis or periimplantitis and periodontitis-causing bacteria, reduce odor or odor-causing bacteria, reduce caries or caries-causing pathogen, reduce plaque, improve wound healing and/or improve teeth whitening.

3. The method of claim 1, wherein the cosmetic composition is in the form of a cream, emulsion, gel, ointment, lotion, spray, foam, solution, dry powder, bath salt, bath ball, tablet, shampoo, hair conditioner, toothpaste, deodorant, soap, skin gel, lip balm, facial mask, or makeup.

4. A method of treating a subject suffering from a dermatologic disease or disorder, comprising the step of administering a therapeutically effective amount of a dry extract of peat with a content of at least 8% (w/w) organic matter comprising at least 20% (w/w) fulvic acid, at least 60% (w/w) humic acid, and at least 8% (w/w) ulmic acid, wherein the extract is characterized by having a maximum average particle size of 20 micrometers ($\mu$m).

5. The method of claim 4, wherein the dry extract is formulated in the form of a cream, emulsion, gel, ointment, lotion, spray, dry powder, or a tablet.

6. The method of claim 4, wherein the dermatologic disease or disorder is selected from the group consisting of acne, psoriasis, atopic dermatitis, skin inflammation and skin redness.

7. A dietary supplement comprising a dry extract of peat with a content of at least 8% (w/w) organic matter comprising at least 20% (w/w) fulvic acid, at least 60% (w/w) humic acid, and at least 8% (w/w) ulmic acid, wherein the dry extract is characterized by having a maximum average particle size of 20 micrometers ($\mu$m).

8. The dietary supplement of claim 7, wherein particles in the dry extract comprise a hardness on the Mohs scale between 1 and 3.

9. The dietary supplement of claim 8, wherein the absorbent Brunauer-Emmett-Teller (BET) surface area of said particles is at least 0.5 m$^2$/g.

10. The dietary supplement of claim 7, wherein the dietary supplement is formulated in the form of a lozenge, a chewing gum, a sublingual spray, a solid or semi-solid candy, a tablet, an orally disintegrating tablet, a troche, or an oral film strip.

11. The dietary supplement of claim 7, wherein the dietary supplement further includes an ingredient selected from the group consisting of a vitamin, a mineral, an herb, and a metabolite.

* * * * *